United States Patent
van Os et al.

(10) Patent No.: US 10,146,830 B2
(45) Date of Patent: Dec. 4, 2018

(54) CROSS APPLICATION FRAMEWORK FOR AGGREGATING DATA RELATING TO PEOPLE, LOCATIONS, AND ENTITIES

(71) Applicant: Apple Inc., Cupertino, CA (US)

(72) Inventors: Marcel van Os, Santa Cruz, CA (US); Scott Herz, San Jose, CA (US)

(73) Assignee: APPLE INC., Cupertino, CA (US)

( * ) Notice: Subject to any disclaimer, the term of this patent is extended or adjusted under 35 U.S.C. 154(b) by 248 days.

(21) Appl. No.: 14/246,128

(22) Filed: Apr. 6, 2014

(65) Prior Publication Data

US 2015/0112990 A1    Apr. 23, 2015

Related U.S. Application Data

(60) Provisional application No. 61/893,130, filed on Oct. 18, 2013.

(51) Int. Cl.
*G06F 17/30* (2006.01)

(52) U.S. Cl.
CPC .. *G06F 17/30412* (2013.01); *G06F 17/30029* (2013.01); *G06F 17/30038* (2013.01)

(58) Field of Classification Search
CPC ............................ G06F 17/30; G06F 17/30412
See application file for complete search history.

(56) References Cited

U.S. PATENT DOCUMENTS

| | | | |
|---|---|---|---|
| 8,463,289 B2 | 6/2013 | Shklarski et al. | |
| 2010/0306185 A1* | 12/2010 | Smith | G06Q 10/107 707/709 |
| 2011/0099486 A1* | 4/2011 | Nesladek | G01C 21/265 715/753 |
| 2011/0197163 A1* | 8/2011 | Jegal | G06F 3/0482 715/811 |
| 2012/0210253 A1* | 8/2012 | Luna | G06Q 10/107 715/753 |
| 2014/0032259 A1* | 1/2014 | LaFever | G06Q 30/0201 705/7.29 |
| 2015/0019522 A1* | 1/2015 | Kim | G06Q 10/10 707/706 |

* cited by examiner

*Primary Examiner* — Khanh B Pham
(74) *Attorney, Agent, or Firm* — Morgan, Lewis & Bockius LLP

(57) ABSTRACT

Some embodiments provide a cross application framework that supports a number of different applications and/or services to aggregate data relating to people, locations, and entities. The framework of some embodiments aggregates, from various data sources, different types of data, such as multimedia, communications, social media data, and location data. Once the data is aggregated, the framework provides the data to each requesting application. When an application is used to search for a person, the framework may provide the application with the person's emails, text messages, videos, photos, and social network activities.

21 Claims, 19 Drawing Sheets

CROSS APPLICATION FRAMEWORK FOR AGGREGATING DATA RELATING TO PEOPLE, LOCATIONS, AND ENTITIES

CLAIM OF BENEFIT TO PRIOR APPLICATIONS

This application claims the benefit to U. S. Provisional Patent Application 61/893,130, entitled "Cross Application Framework for Aggregating Data Relating to People, Locations, and Entities" filed Oct. 18, 2013.

BACKGROUND

Today, data relating to an entity, such as a person or location, is stored in various different data sources. As an example, a restaurant can be featured in a number of different websites through different web services. The restaurant may have its own page with a social network service, another page with an online business review service, etc. Similarly, a person's data can be distributed across various different data sources. For instance, a person's pictures and videos may be stored with several different cloud services (e.g., a multimedia sharing service, a social network service, etc.).

There are several problems with such data that is distributed across different data sources. First, the data is difficult to share. If a person wants to share his or her online profiles with another individual, then the person would have to communicate to individual the different web services the person is a part of, as well as the login names or usernames of the web services. Sharing becomes even more difficult when people changes services (e.g., become a part of a new service, and/or abandon another service).

Another problem with such distributed data is that it can be difficult to search the data. To find data relating to an entity, a person has to navigate to different websites. The person may have to open several different applications to view the data. For instance, the person may have to open a multimedia sharing application to view pictures or videos relating to an entity, open a social network application to view social media posts relating to the entity, open a map application to view location data relating the entity, open a message application to view communications (e.g., emails, text messages) relating to the entity, etc.

BRIEF SUMMARY

Some embodiments provide a cross application framework that supports a number of different applications and/or services to aggregate data relating to people, locations, and other entities. The framework of some embodiments aggregates, from various data sources, different types of data, such as multimedia (e.g., video, photos), communications (e.g., emails, text messages), social media data (e.g., social network activities), and location data (e.g., the current location of a person, the location where the person checked into). Once the data is aggregated, the framework provides the data to any one or more of the different applications. For instance, when an application is used to search for a person, the framework may provide the application with the person's emails, text messages, videos, photos, social network activities, etc.

In some embodiments, the framework is used to access various web services to aggregate or download data onto a device. For instance, the framework may access a social network service to download several social network posts relating to an entity (e.g., a person, a location), a multimedia sharing service to download photos and/or videos relating to the entity, etc. In conjunction with one or more web services, or instead of them, the framework of some embodiments is used to access data that is locally stored on a computing device. For instance, the framework may be used to gather photos or videos relating to an entity that are stored in a particular folder on the computing device or gather recent communications relating to the entity from a local cache of a communication application. The framework of some embodiments works in conjunction with one or more applications to aggregate data relating to an entity.

To aggregate data relating to an entity, the framework of some embodiments uses a profile associated with the entity. The profile may include various information regarding the entity, including entity identifiers or social media handles (e.g., usernames or login names) of different web services. The framework may aggregate data from each web service using the corresponding entity identifier from the profile. In some embodiments, the profile is a contact card created by the entity to share data with another entity. The contact card may be synced across multiple different devices, in some embodiments. Instead of a contact card, the profile can be an online public profile or registry relating to a person or location.

In addition to the framework, some embodiments provide an application that uses the framework to aggregate data and present the aggregated data. The framework of some such embodiments includes a staging area to view the aggregated data. In particular, the staging area allows the application's user to quickly view (e.g., scroll and/or navigate) between different types of aggregated data, such as photos relating to a person, communications relating to the person, etc. In this manner, the user does not have to open different applications and/or access different websites to view data relating to the entity.

One of the main ideas described herein is to break the application boundary and allow the user to search across different data sources. Breaking the application boundary means that every application can be discovered in another application. That is, the application's user can seamlessly transition to the different views with different data (e.g., quickly switch from viewing a restaurant's entire menu to viewing its reviews, making a reservation, or ordering a menu item; quickly switch from viewing a person's photos and videos from a number of different social network services to viewing the person's emails and text messages, etc.).

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features as described here are set forth in the appended claims. However, for purposes of explanation, several embodiments are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Embodiments described herein provide a cross application framework that supports a number of different applications and/or services to aggregate data relating to people, locations, and entities. The framework of some embodiments aggregates, from various data sources, different types of data, such as multimedia (e.g., video, photos), communications (e.g., emails, text messages), social media data (e.g., social network activities), and location data (e.g., the current location of a person, the location where the person checked into with a social network service). Once the data is aggregated, the framework provides the data to any one or more of the different applications. For instance, when an application is used to search for a person, the framework may provide the application with the person's emails, text messages, videos, photos, and social network activities.

Figure 1:
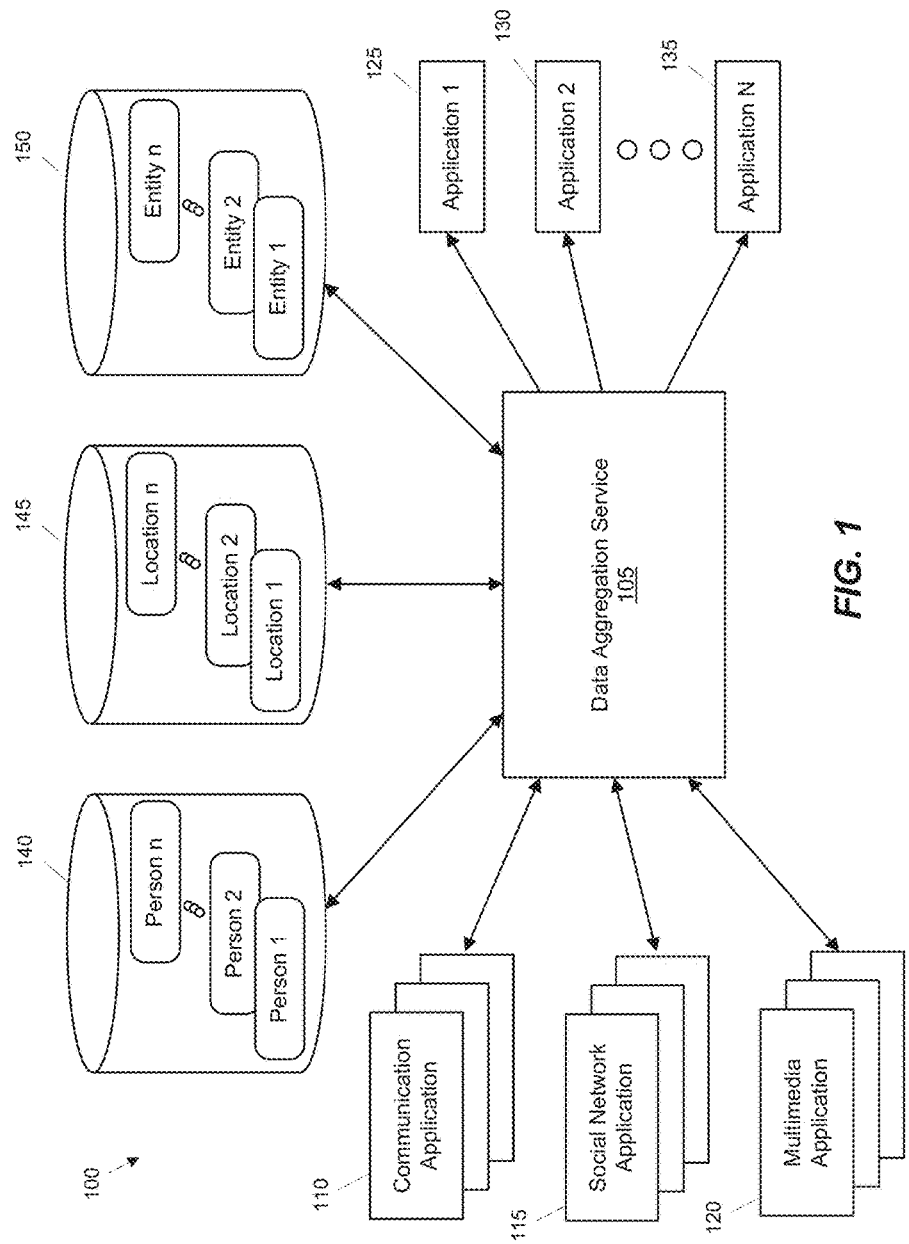
FIG. 1 illustrates a system with a data aggregation framework that gathers data for number of different applications.

For some embodiments, FIG. 1 illustrates a system 100 with a data aggregation framework 105 that supports a number of different applications 125-135. The framework 105 of some embodiments is a service that operates in conjunction with several data sources 110-120 to gather data for the applications 125-135. In the example of FIG. 1, the data sources 110-120 include at least one communication application 110, a social network application 115, and a multimedia application 120. However, the data aggregation service 105 may operate in conjunction with fewer data sources or even more data sources.

The communication application 110 can be any different type of communication application that is used to exchange messages. Examples of such an application include an email application to exchange emails and a text message application to exchange text messages (e.g., Short Message Service (SMS) messages or other instant messages, etc.). Different from the communication application 110, the multimedia application 120 is used to manage multimedia. The multimedia application can be a camera application to capture photos and videos, a media editing application to edit multimedia, a media organizing application to organize multimedia, etc.

In the system 100 of FIG. 1, the social network application 115 represents an application to access a social network service. There are many different social network services. A social network service in general provides a platform to build social relations among people. The relationship can be established based on different factors, including shared interests, real-life connections, activities, and professional background. The social network application 115 is used to access services of the corresponding social network. This can include posting messages, blogs, micro-blogs, sharing multimedia, exchange social network messages, etc.

In addition to the data sources 110-120, the system 100 includes several data consumers 125-135. Particularly, the applications 110-120 consume the data provided by the data aggregation service 105. Each of these applications can be any different type of application such as a map application, a contacts application, or a search application. Instead of, or in conjunction with, a standalone application, in some embodiments, an operating system's search tool is the consumer of the data provided by the data aggregation service 105. As an example, when a user enters a name of a person in the search tool, the service 105 might gather emails, videos, pictures, social media postings, and other data; and provide that data to the search tool. In this manner, the search tool displays the received data as a part of the search result set.

As mentioned above, the data aggregation service 105 of some embodiments operates in conjunctions with the data sources 110-120 to gather data for the data consumers 125-135. In some embodiments, the data aggregation service 105 aggregates communications (e.g., emails, text messages) through one or more of the communication applications. The data aggregation service 105 aggregates multimedia (e.g., video clips, photos) through one or more of the multimedia applications. The data aggregation service 105 aggregates social network activities (e.g., text posts, video posts, photo posts) through one or more of the social network applications.

FIG. 1 also shows several storages 140-150 that store the gathered data. The storage's contents are conceptually shown in this figure as being partitioned into three separate storages. However, one of ordinary skill in the art would realize that the contents of these storages could be distributed across less storage (e.g., one storage) or even more storages. As shown, the storage 140 stores data relating to people, the storage 145 stores data relating to locations, and the storage 150 stores data relating to entities. Locations can encompass businesses (e.g., places that provide goods or services, such as restaurants, movie theaters, etc.), institutions, residences, and other places (e.g., a geographic area such as a park, a lake, etc.). In some embodiments, entities represent everything else that does not fall into the people and location categories. An entity in some embodiments can be literally anything that a person or a group of people might be interested in, e.g., an event (e.g., concert, sporting event), food, movie, religion, affiliation, an organization (e.g., Red Cross), etc.

Having described the system's components of FIG. 1, an example operation of the system 100 will now be described. The data aggregation service 105 operates in conjunction with one or more of the communication applications to aggregate communication data (e.g., emails, text messages). The data aggregation service 105 operates in conjunction with one or more of the multimedia applications to aggregate multimedia (e.g., photos, video clips). The data aggregation service 105 of some embodiments operates in conjunction with one or more social network applications to aggregate social network data. The social network data can include social network activities (e.g., postings, messages) and multimedia (e.g., photos, video clips).

In some embodiments, the data aggregation service 105 stores the data gathered from the data sources 110-120 in one or more of the storages 140-150. For instance, the data aggregation service 105 might store communications, multimedia, and social network data relating to a person in the storage 140. The data aggregation service 105 might store communications, multimedia, and social network data relating to a location in the storage 145. In addition, the data aggregation service 105 might store communications, multimedia, and social network data relating to an entity in the storage 150.

Instead of storing the data, the data aggregation service dynamically gathers data when it receives a request for the data from a data consumer (e.g., the application 125, 130, or 135). Alternatively, in some embodiments, the data aggregation service 105 might store data from some of the data sources 110-120 but not all of the data sources. For instance, a photo application might capture a photo and store it in the device's storage, and the data aggregation service 105 may interface with a media library framework (not shown) to locate the photo when requested by a data consumer.

Figure 2:
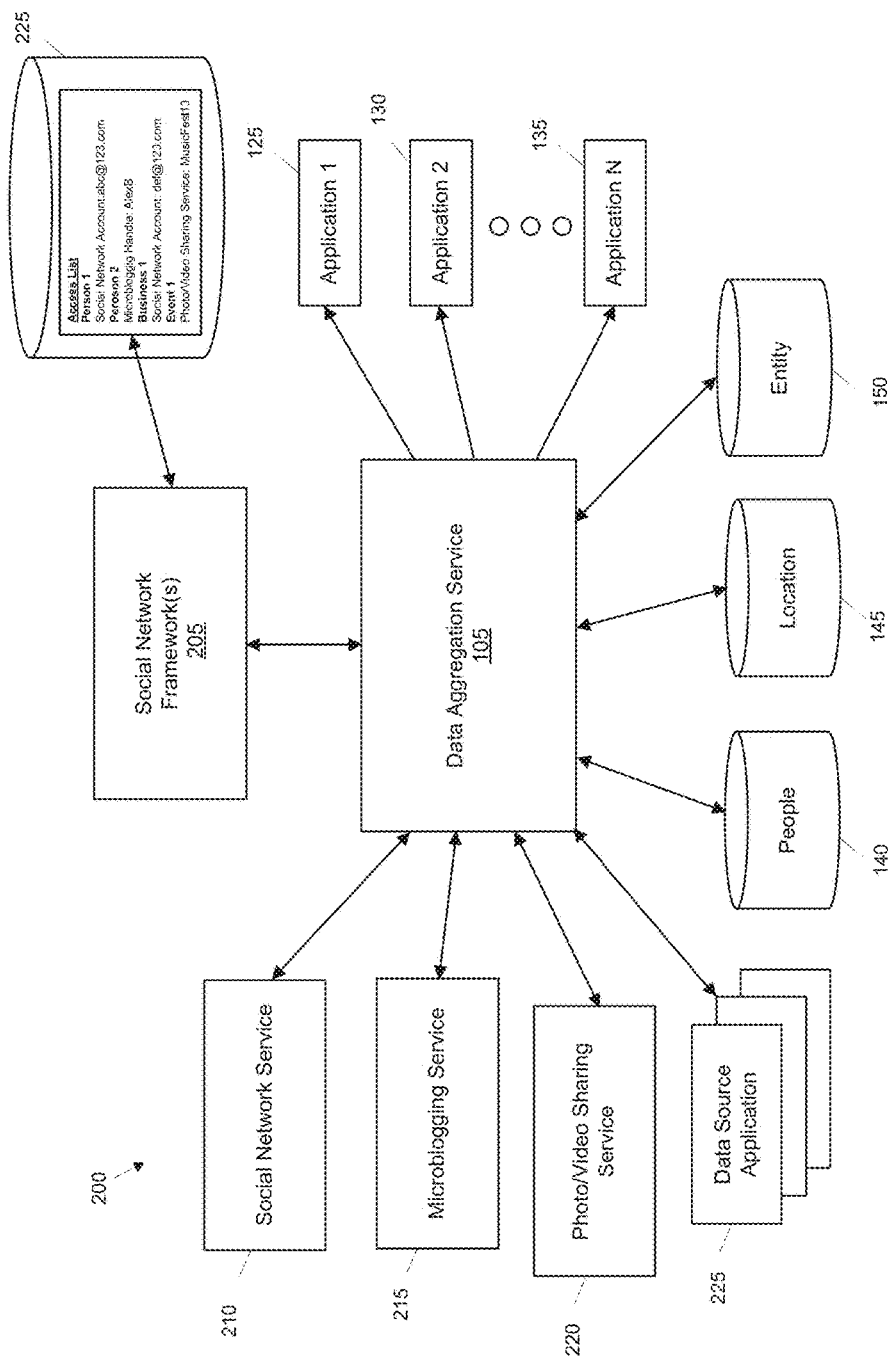
FIG. 2 provides an illustrative example of a system that uses a set of social network frameworks to gather data from remote data sources.

In some embodiments, the data aggregation service 105 utilizes one or more separate data access framework in order to aggregate data from different data sources. FIG. 2 provides an illustrative example of a system 200 that uses a set of one or more social network framework 205 to aggregate data from social network services 210-220.

In some embodiments, the social media services 210-220 are remote data sources that are accessible by the data aggregation service 105 through the set of social network frameworks 205. In other words, these sources 210-220 are not one of the applications 225 that are installed on the same device that executes the data aggregation service 105. In the example of FIG. 2, the services include a social network service 210, a microblogging service 215, and a photo/video sharing service 220.

The set of social network frameworks 205 provides interfaces to access social media accounts for different social network services 210-220. In particular, the set of social network frameworks 205 allows programmers to integrate applications with supported social networking services. The framework 205 of some embodiments provides various modules to create a network session and retrieve the activity feed for a particular person, a location, or an entity. In some embodiments, the set of social network frameworks 205 has access to account information to retrieve social network data from the services 210-220. For instance, the set of network frameworks 205 accesses a storage 225 that has account names, tags, and/or handles for people, locations, and entities.

Several more detailed examples of the data aggregation framework are described below. Specifically, Section I describes examples of how the framework supports different types of applications, including a contacts application, a map application, and a search application. Section II then describes an example of presenting data relating to an entity. This section also describes how some embodiments automatically create an entity and present the entity to a person. This is followed by Section III that describes several examples of managing access to data from different social network services. Section IV then describes an example software architecture of an operating system with such a data aggregation framework. Lastly, Section V describes an electronic system that implements some embodiments of the invention.

I. Example Use Cases

The data aggregation framework of some embodiments provides support for different applications. Several example uses cases of the framework will now be described below by reference to FIGS. 3-9. In these examples, the framework supports a contacts application, a map application, and an operating system's search tool. However, the framework can support other applications and other operating services, in some embodiments.

A. Contacts Application

Figure 3:
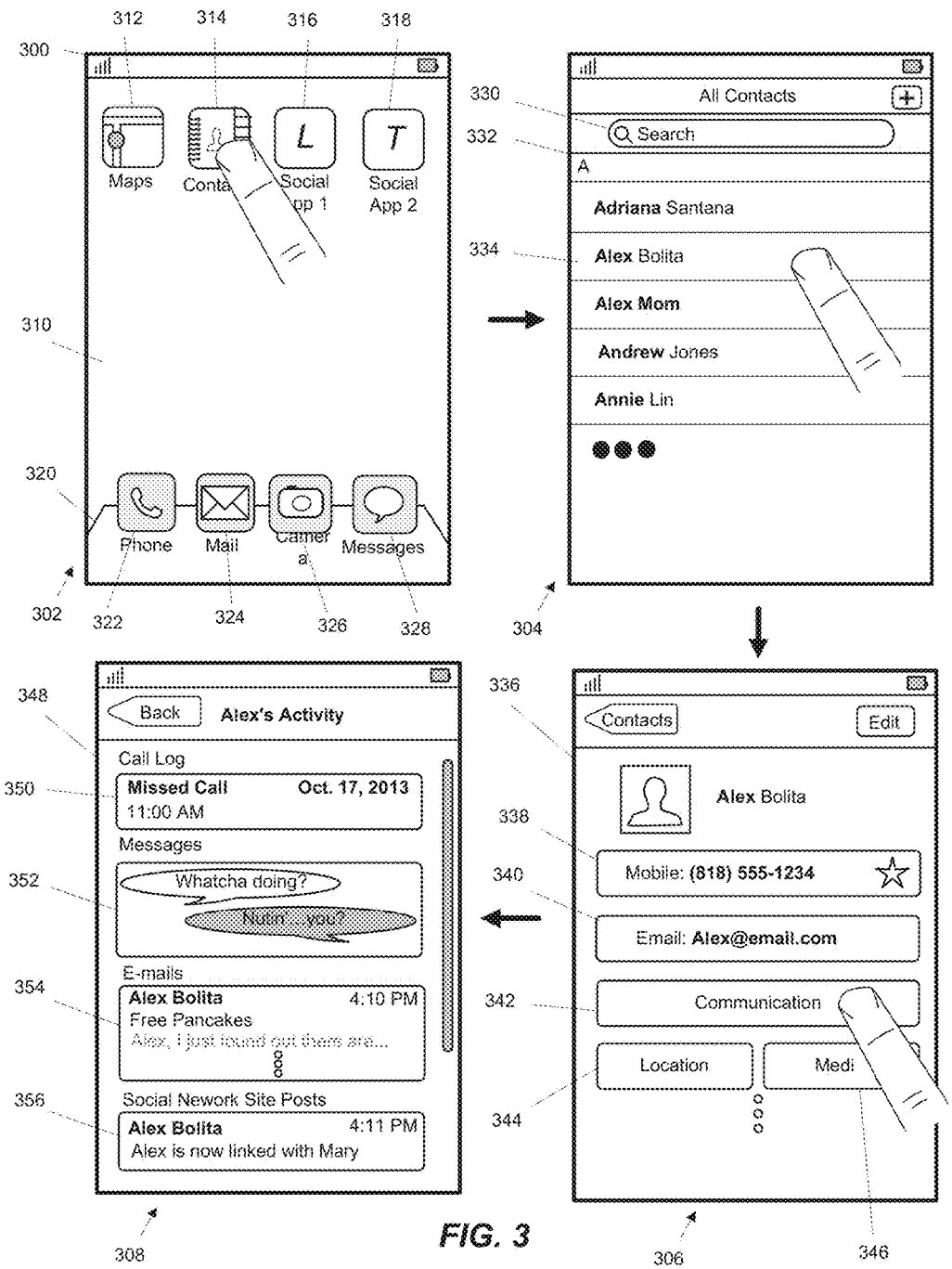
FIG. 3 provides an illustrative example of how the data aggregation framework of some embodiments provides support for a contacts application.

FIG. 3 provides an illustrative example of how the framework of some embodiments provides support for a contacts application. Specifically, this figure shows how the framework aggregates data to display communications relating to a person. This figure also introduces a user interface with several affordances that allows a user to switch between the contact information, which is currently in the card, and other data (e.g., communications, location data, and multimedia) relating to the person. Four operational stages 302-308 of the mobile device are shown in this figure. The first stage 302 shows the device 300 displaying a home page 310 on the device's touch-sensitive screen. The home page 310 shows several icons 312-318 for launching different applications. These icons include a maps icon 312 for launching a map application, a contacts icon 314 for launching a contacts application, a first social media icon 316 for launching a first social media application, and a second social media icon 318 for launching a second social media application. The homepage 310 is also overlaid by a dock 320. Several other icons 322-328 are arranged along the dock. Specifically, the icons includes (1) a phone icon 322 for a phone application to make phone calls, (2) an email icon 324 for an email application to view and exchange emails, (3) a camera icon 326 for a camera application to capture and view photos and videos, and a message icon 328 for a message application to exchange messages (e.g., SMS messages or other instant messages).

In the first stage 302, the device's user selects the contact icon 314 for the contacts application. In particular, the device's user taps the user's finger on the touch screen display over the icon 314. The touch input gesture causes the contacts app to be opened, as illustrated in the second stage 304.

The second stage 304 shows that the contacts application has been opened to a page 360 with a list of contacts 332. This page 360 also includes a search tool 330. The user can use the search tool 330 to search for a particular person or place (e.g., business). In some embodiments, the search tool filters the list of contacts 332 to only each person or place that satisfies the search query. In the example of the second stage 304, each person is listed in the list in alphabetical order by the person's first name. To display additional data regarding a particular person, the user may select the name of the person from the list. As illustrated in this example, the user is selecting the name "Alex Bolita" 334 from the list of contacts 332.

The third stage 306 shows the device 300 after the user has selected the name Alex Bolita 334 from the contacts list 332. The selection resulted in the device displaying a page 336 with additional info relating to the person. As shown, the page 336 displays the name of the person, Alex Bolita. The page can also display a picture of the person. The page includes several fields 338-340. These fields show the email address and phone number of the person.

In the example of the third stage 306, the page 336 includes several selectable items to display additional information regarding the person. The additional information can include data gathered by the data aggregation framework. Specifically, the page includes a communication tab 342 to display communications relating to the person, a location tab 344 to display location data relating to the person, and a media tab 346 to display multimedia data (e.g., pictures, videos) relating to the person. In some embodiments, the page 336 is referred to as a staging area 336 for displaying additional data regarding the person.

In the third stage 306, the user directs the contacts application to display communications relating to the person. Specifically, the user taps the user's finger on the touch screen display over the communication tab 342. As shown in the fourth stage 308, the gesture causes the device to display a page 348 that shows the person's communications. In particular, the page 348 displays the person's call log 350, text messages 352, e-mail messages 354, and social networking posts 356. As illustrated, each of these communications was retrieved from a different application (e.g., email application, social networking application). The user is thus able to view different communications related to the person across different applications.

Figure 4:
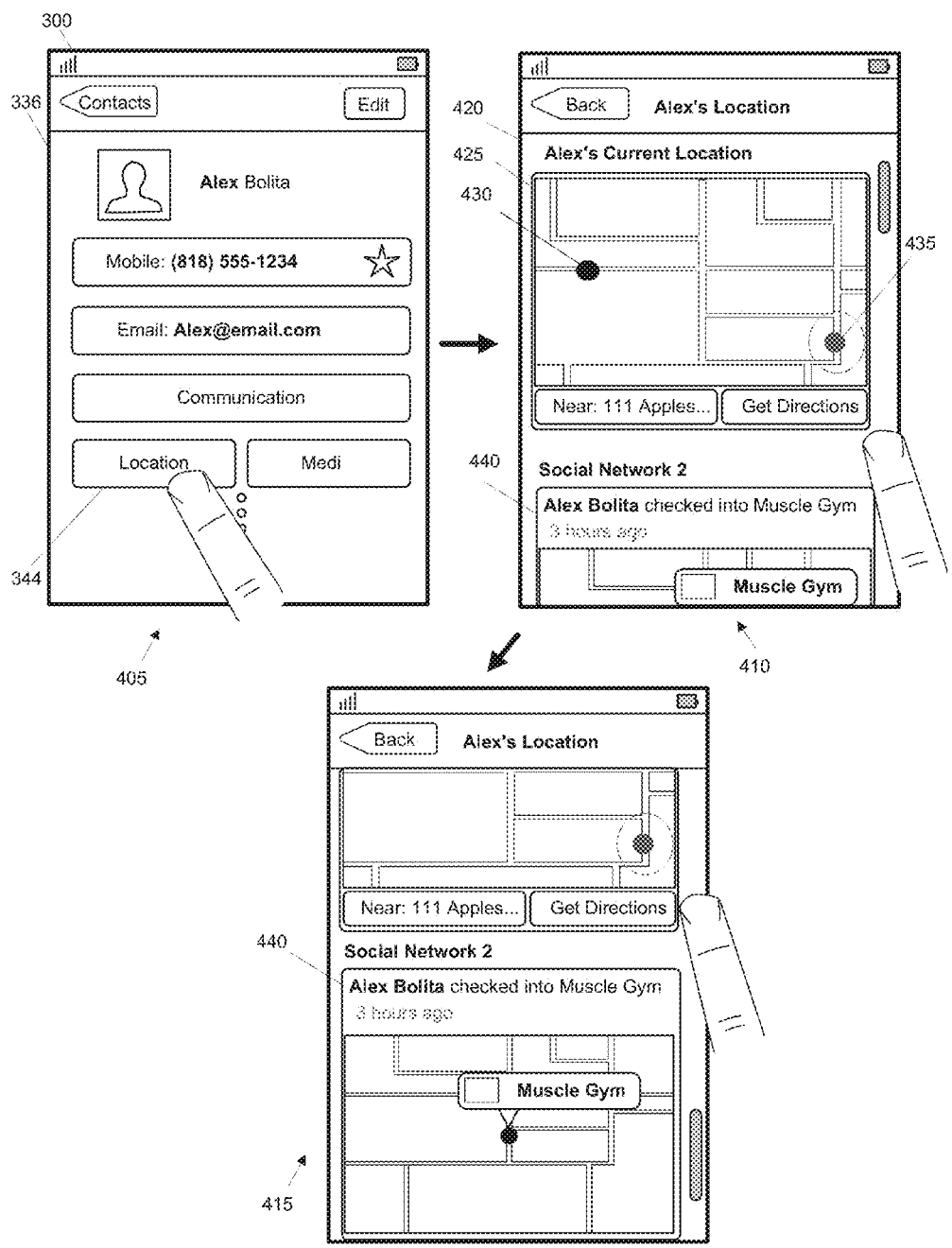
FIG. 4 provides an illustrative example of how the framework of some embodiments presents location data relating to a person.

In addition to viewing communication data related to a particular person, the framework of some embodiments also allows a user to view location data related to a person. FIG. 4 provides an illustrative example of how the framework of some embodiments presents data about a location(s) of a particular person as gathered from different data sources. Specifically, this figure illustrates three stages 405-415 of the device displaying location information related to a particular person. Stage 405 illustrates the device 300 displaying the staging area 336 for a particular person, Alex Bolita. As previously described, the staging area 336 includes information regarding the person's telephone number and e-mail address. Furthermore, the staging area 336 displays tabs for accessing communications, media, or location data related to the person. As illustrated in this stage 405, the device 300 is receiving a user's touch input over the location tab 344. The touch input causes the device to display the location information related to Alex Bolita, as illustrated in the stage 410.

Stage 410 illustrates the device 300 displaying a page 420 with several maps 430-440. Each map provides location data that has been retrieved from a particular data source (e.g., map application or social network service). In particular, map 430 displays the current location of the person 435 as determined by the particular map application. The user may then select different tabs for different purposes, including a "get directions" tab to receive directions from the user's current location (i.e., the location of the device) to the particular person (i.e., Alex Bolita). The page 425 also displays a map 440 for location data gathered from the social network service. As illustrated in stage 410, the device is receiving a user's touch input to scroll down on the page, and thus bring into the display area more of the map 440 for the social network service.

Stage 415 illustrates the device 300 displaying a greater portion of the map 440 based on the social network service. Specifically, this map 440 indicates that this person checked into "Muscle Gym" 3 hours ago. As such, the page 425 displays location data gathered from multiple different sources, including the map application, social network services, and other sources that are capable of providing this type of information to the device.

Figure 5:
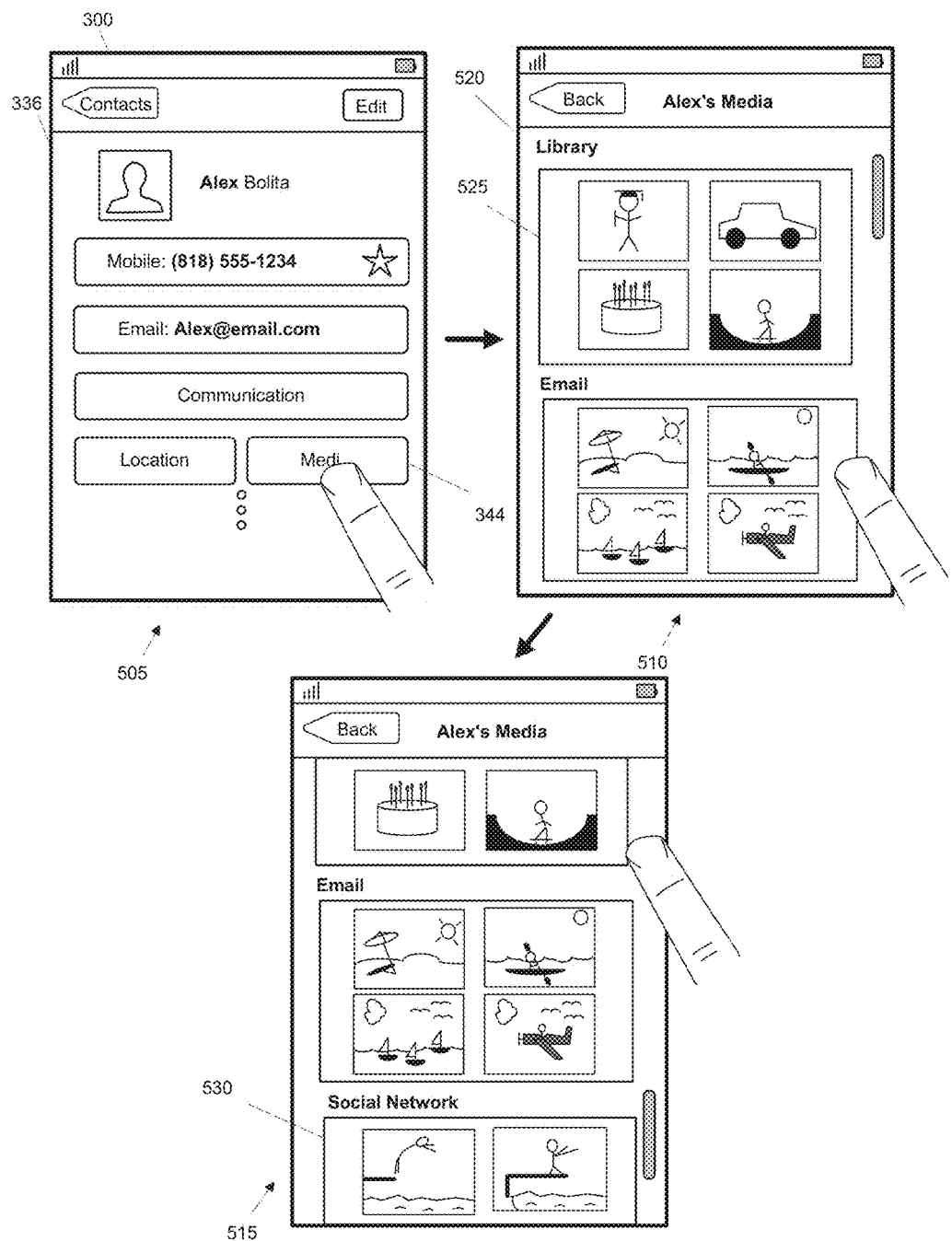
FIG. 5 provides an illustrative example of how the framework of some embodiments displays multimedia relating to a person.

In addition to viewing communication data (e.g., FIG. 3) and location data (e.g., FIG. 4) related to a particular person, the framework of some embodiments also allows a user to view various media data (e.g., images and videos) related to a person. FIG. 5 provides an illustrative example of how the framework of some embodiments displays media data related to a particular person. Specifically, this figure illustrates three stages 505-515 of the device displaying media data related to a particular person.

Stage 505 illustrates the device 300 displaying the same staging page 336 described above by references to FIGS. 3 and 4. In particular, the staging page 336 is displaying information for a particular person, Alex Bolita. In this particular example, the device 300 is receiving a touch input of the media tab 344. The input causes the device to display multimedia (e.g., photos, video) related to the particular person, as illustrated in stage 510.

Stage 510 illustrates the device 300 displaying a page 525 that includes multimedia from various different sources. In particular, page 525 is displaying images that are stored within a library of the device, images gathered from e-mails (i.e., as attachments in emails or from the body of emails, etc.). Furthermore, stage 510 illustrates the user scrolling down on the page to view additional multimedia data from different sources (i.e., applications or services).

Stage 515 illustrates the device displaying multimedia data (i.e., videos and images) gathered from a social network 530 application. As such, the device provides the user with a holistic view of all of the person's multimedia data as gathered from a variety of different applications (e.g., email, media editing applications, etc.) and services (e.g., social networks, image services, etc.). In addition to accessing the communication, location, and media data from the staging page described in FIG. 3-6, in some embodiments, the operating system of the device allows a user to access this same data through various different user interface mechanisms.

In some embodiments, the data aggregation framework aggregates multimedia based on metadata (e.g., tags, key-words, markings, album name). For example, the framework may use tags and/or album names to aggregate multimedia regarding a person, location, or entity. In some embodiments, the data aggregation framework communicates a social network framework to retrieve photos and videos from a social network service. The aggregation framework might utilize the social network framework to dynamically retrieve (in response to an application query) multimedia postings relating to a person, a location, or an entity from a social network site.

B. Search Tool

Figure 6:
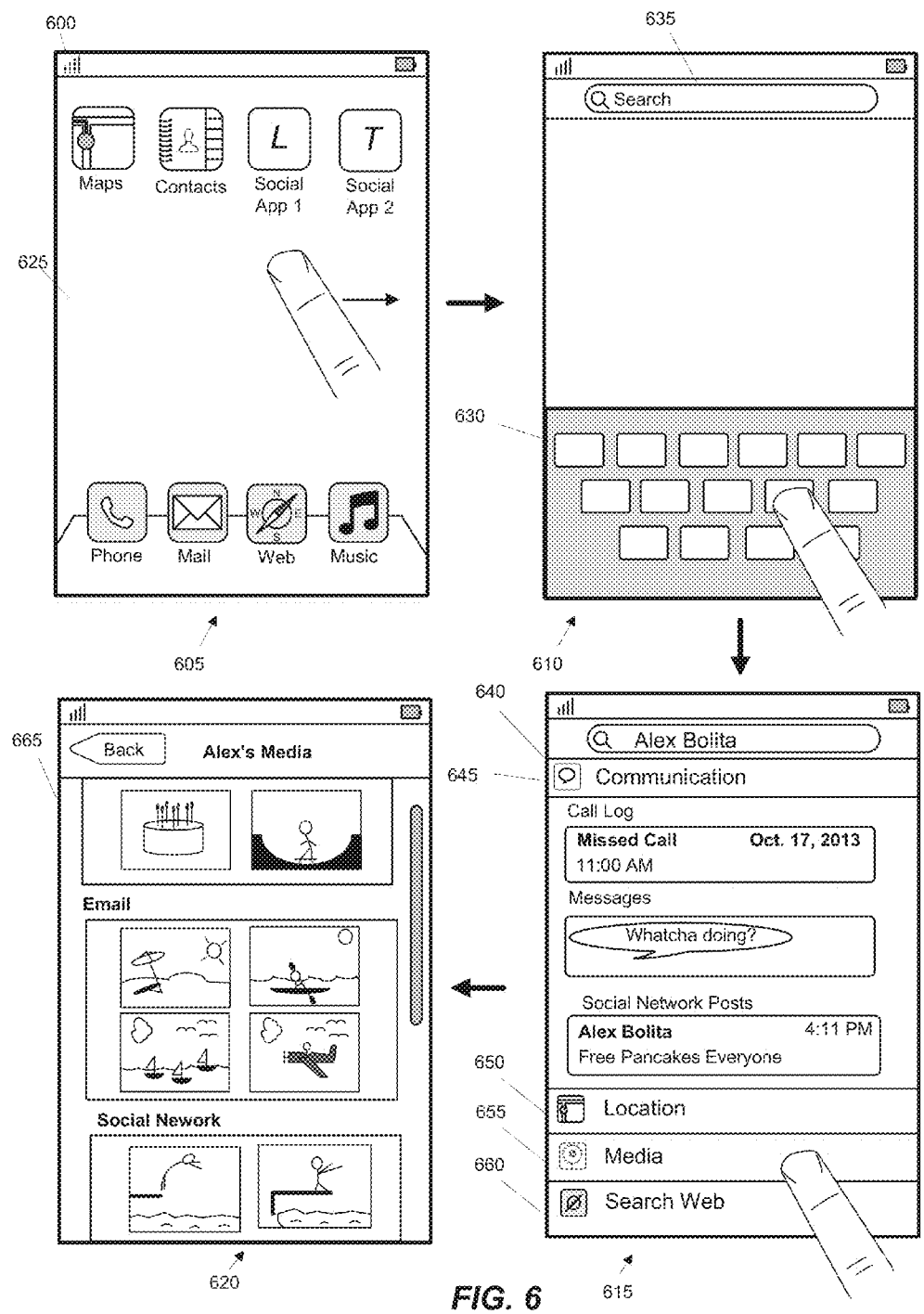
FIG. 6 provides an illustrative example of how the framework of some embodiments provides support for a search tool of an operating system.

In the example use cases described above, the data aggregation framework provides support for a contacts application. In some embodiments, the data aggregation framework provides support for a search or finder tools of an operating system (OS). FIG. 6 provides an illustrative example of how the framework of some embodiments provides support for a search tool. In particular, the figure illustrates four stages 605-620 of a user searching for a particular person and being presented with different data related to the person. Stage 605 illustrates the device 600 displaying the home page 625 of the operating system. The home page 625 displays the set of selectable icons for launching different applications, including the map application, the contact application, a social app 1 application, and a social app 2 application. The homepage 625 is also overlaid by the dock that includes the phone icon, email icon, web icon, and music icon.

Stage 605 illustrates the device 600 receiving a swiping gesture on the home screen 625. In particular, the user is touching the screen of the device 600 and swiping their finger in a particular direction (e.g., a downward direction) on the screen. In some embodiments, when the device 600 detects such a swiping gesture, the device presents a search tool for searching data on the device.

Stage 610 illustrates the device 600 now displays a search tool 635 and an on-screen keyboard 630, which have replaced the home page 625 that was displayed in stage 605 as a result of the user's performing the swiping gesture. The search tool 635 receives and displays the search terms that a user has input using the on-screen keyboard 630 and that will be searched by the device 600. The user may input different search terms by touching the appropriate keys on the on-screen keyboard 630.

Stage 615 illustrates that the search tool 635 displays the search term "Alex Bolita". This term was input by the user during stage 610. As such, the device 600 is displaying various different types of data that has been gathered by the device for the particular search term within a search result page 640. In particular, the page 640 displays a communication section 645 that provides a list of different types of communications of the particular person, a location tab 650 for providing location data related to the person, a media tab 655 for displaying multimedia (e.g., pictures, videos) related to the person, and a search web 660 tab for providing information related to the person as available on the Internet.

As illustrated in stage 615, the communication 645 section further displays different types of communications related to the person, including a call log, text messages, and social network posts related to Alex Bolita. The call log indicates that there was a missed call from Alex at 11:00 AM on Oct. 17, 2013. The text messages display a text message sent between Alex Bolita. Lastly, the social network posts section indicates that Alex Bolita posted a message "Free Pancakes Everyone" at 4:11 PM. As such, the staging area 640 displays a variety of different types of communications gathered from different applications (e.g., call log, text messages, social media, etc.) related to the particular person. Thus, the device 600 is able to provide a holistic view of all of a person's communications gathered from different applications and services.

Stage 615 also illustrates the device 600 receiving a touch input on the media tab 655. In particular, the user is interested in viewing media data for Alex Bolita. Stage 620 illustrates the device 600 displaying the various media 655 for Alex Bolita. As illustrated, the display area displays images gathered from emails, social networks, and various other data sources.

In the example described above, the search result page 615 displays communications from various data sources but does not display location data and multimedia. That is, the user has to select a tab to display the location data and the multimedia data. In some embodiments, the search tool can be used to display a search result page that includes communications, location data, and multimedia for a particular person, location, or entity.

Figure 7:
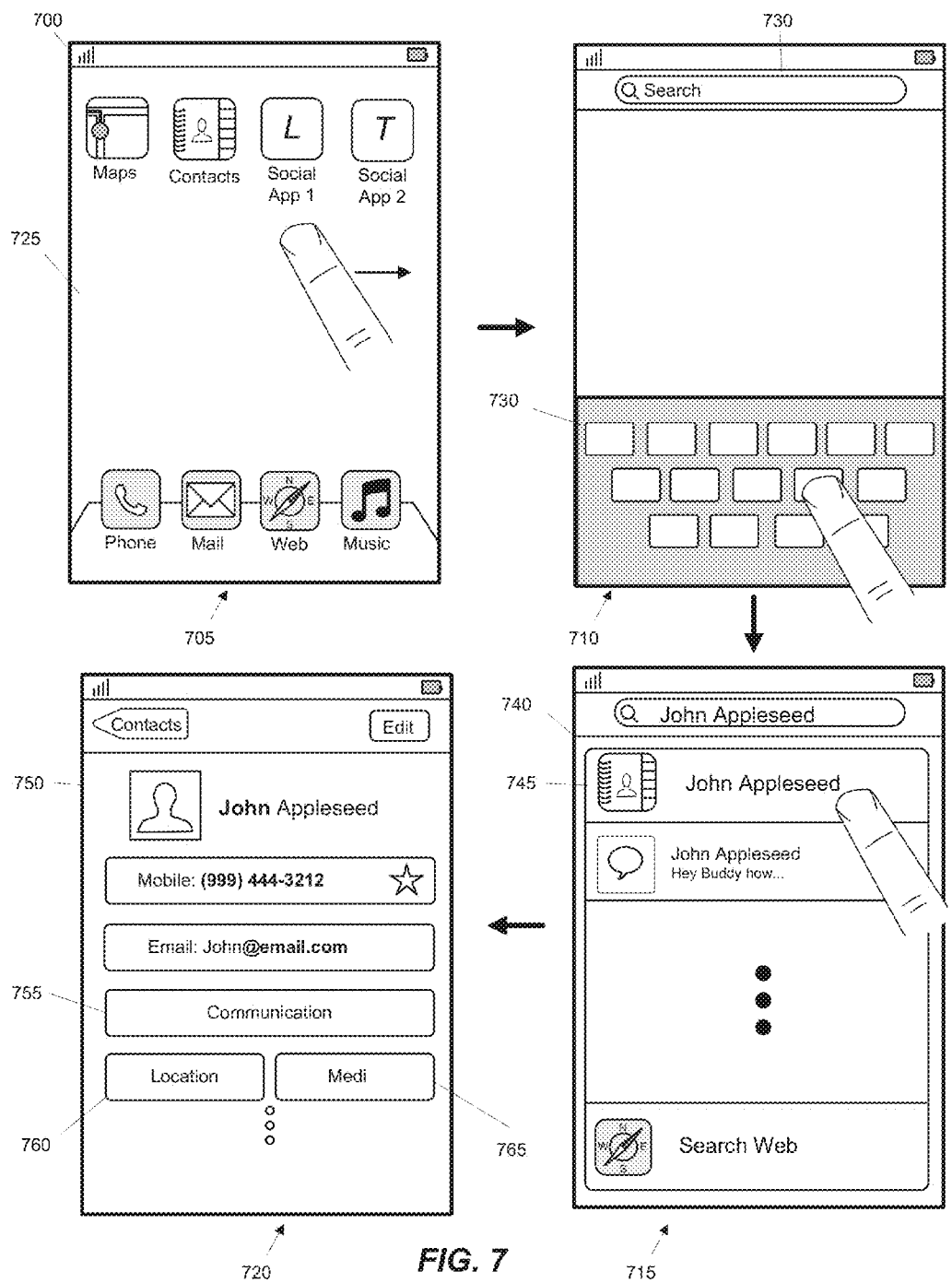
FIG. 7 provides another example of how the framework of some embodiments provides support for a search tool of an operating system.

FIG. 7 provides another example of how the framework of some embodiments provides support for a search tool of an operating system (OS). This figure is similar to the previous figure. However, in this example, the search result includes a contact for a person. The device's user selects this contact to display a staging area for accessing communication, location data, and media data relating to the person. This figure illustrates four stages 705-720 of the user searching for a particular person and the operating system presenting the staging area for accessing different types of data related to the person.

Stages 705 and 710 of FIG. 7 are identical to stages 605 and 610 of FIG. 6. In particular, stage 705 illustrates the home page 725 being displayed by the operating system of the device 700. Furthermore, the device 700 is receiving a downward swiping gesture from the user. Stage 710 illustrates the operating system of the device 700 displaying a search tool 730 for entering and displaying search terms and the GUI of a keypad 730.

Stage 715 illustrates the operating system displaying various search results for the search term "John Appleseed" that was input in stage 710. In particular, the search results include a contact 745 icon for John Appleseed, as well as other information. Furthermore, the user is selecting the contact tab 745 in order to view more information for this particular person.

Stage 720 illustrates the device displaying the staging area 750 with various different menu tabs for accessing different data for the contact John Appleseed. The staging area 750 includes the mobile telephone number and email address of this person. Furthermore, the staging area 750 provides a communications 755 tab for accessing different types of communications of the person, a location 760 tab for accessing location data related to the person, and a media 765 tab to display multimedia (e.g., pictures, videos) relating to the person. In addition to providing support for the search tool, the framework provides support for various other applications hosted by the operating system.

C. Map Application

Figure 8:
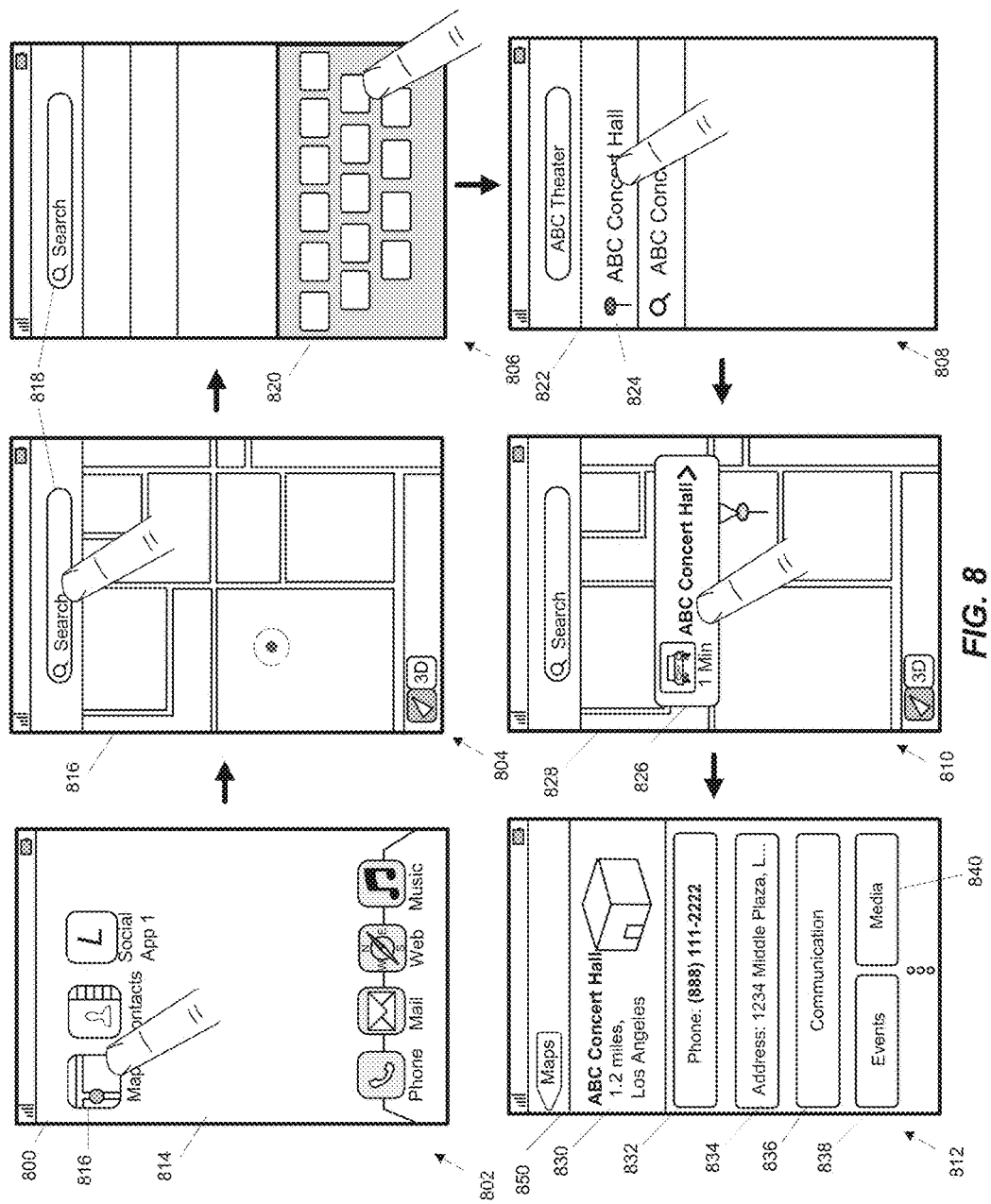
FIG. 8 illustrates an example of how the framework of some embodiments provides support for a map application.

In the example use case described above, the data aggregation framework provides support for a search tool. In some embodiments, the framework aggregates data for a map application. FIG. 8 illustrates an example of how the framework of some embodiments provides support for a map application. Particularly, the six operational stages 802-812 in this figure illustrate how a user can access a staging area 812 of a map application. In some embodiments, the staging area provides access to communications, location data, and/or multimedia relating to a location.

The first stage 802 illustrates the home page 814 of the device 800 displaying three icons for launching three different applications. Particularly, the home page 814 displays a map icon 816 for launching a map application, a contacts icon for launching a contacts application, and a social app 1 icon for launching a social media application. The first stage 802 also shows that the user of the device is selecting the map icon 816 (e.g., by tapping on the touch-sensitive screen of the device over the map icon 816 on) in order to open the map application.

The second stage 804 illustrates that the device is now displaying a map application with a map page 816 and a search tool 818. The map page shows the current location of the user (e.g., the user's device). In some embodiments, the search tool 818 of the map application is for searching for a particular place or location on the map. In the third stage 806, an on-screen keyboard 820 has appeared on the display screen of the device as the result of selecting the search tool 818 in the previous stage. The third stage 804 also shows that the user is entering the name of the desired place into the search tool by using the on-screen keyboard 820.

The fourth stage 808 illustrates that the user has typed "ABC Theater" in the search tool as the location for which the user needs an address. The search tool of some embodiments conducts a dynamic search for all possible locations that the user might have in mind as the user enters the name or address of the place. As shown in the fourth stage 808, the search tool is now displaying a list of locations 822 that have similar names to the search phrase. In some embodiments, when there is more than one result for the search, the search tool displays the results in the list 822 in a particular order (e.g., depending on whether the result exists in the contacts, whether the result is in the search history, etc.). In the fourth stage 808, the user selects the first result (i.e., ABC Concert Hall) by tapping on its corresponding item 824 in the list 822.

The fifth stage 810 illustrates that the map application is now displaying the location of the searched item on the map (e.g., by dropping a pin on the specific location). Additionally, the map application is displaying a banner 826 on top of the searched location (i.e., pointing to the pin), which shows the name of the location and the driving distance from the current location of the device to the searched location (e.g., by displaying the driving time under a car icon on the banner 826). In this stage 808, the user selects the banner 826 by tapping on the touch sensitive screen of the device over the banner 826. In some embodiments, selecting the banner in the map application results in accessing the staging area in order to receive additional data regarding the searched location or place.

The sixth stage 812 illustrates the staging area page 850, which includes different information about the searched place (i.e., ABC Concert Hall) in several different sections. These sections include a name and driving distance section 830, a field 832 for displaying the phone number of the place, and a field 834 for displaying the address of the place. In some embodiments, the selection of the phone number launches a phone application to call the phone number, and the selection of the address launching a navigation application to navigate to the address. The staging area page 828 also includes a communication tab 836 for opening a list of different types of communications related to the location, an events tab location tab 838 for displaying events (e.g., schedule of events) in connection with the searched place, and a media tab 840 for displaying multimedia (e.g., pictures, videos) related to the location.

In some embodiments, the events represent a catalog associated with the entity. Different entities are associated with different catalogs. As an example, a theater's catalog can be the schedule of shows or event, a restaurant's catalog can be its entire menu, a store's catalog can be the products that it sells, etc. In some embodiments, the application allows the user to purchase items from the catalog. For instance, the person can navigate to the events page and use the page to order a ticket to a show that is scheduled at the location. The catalog of some embodiments includes a list of featured items, such as today's menu special, sale items, etc. The catalog may be downloaded from one or more different services, such as a movie ticket and show time service, a web-based restaurant menu service, travel arrangement service, etc.

Figure 9:
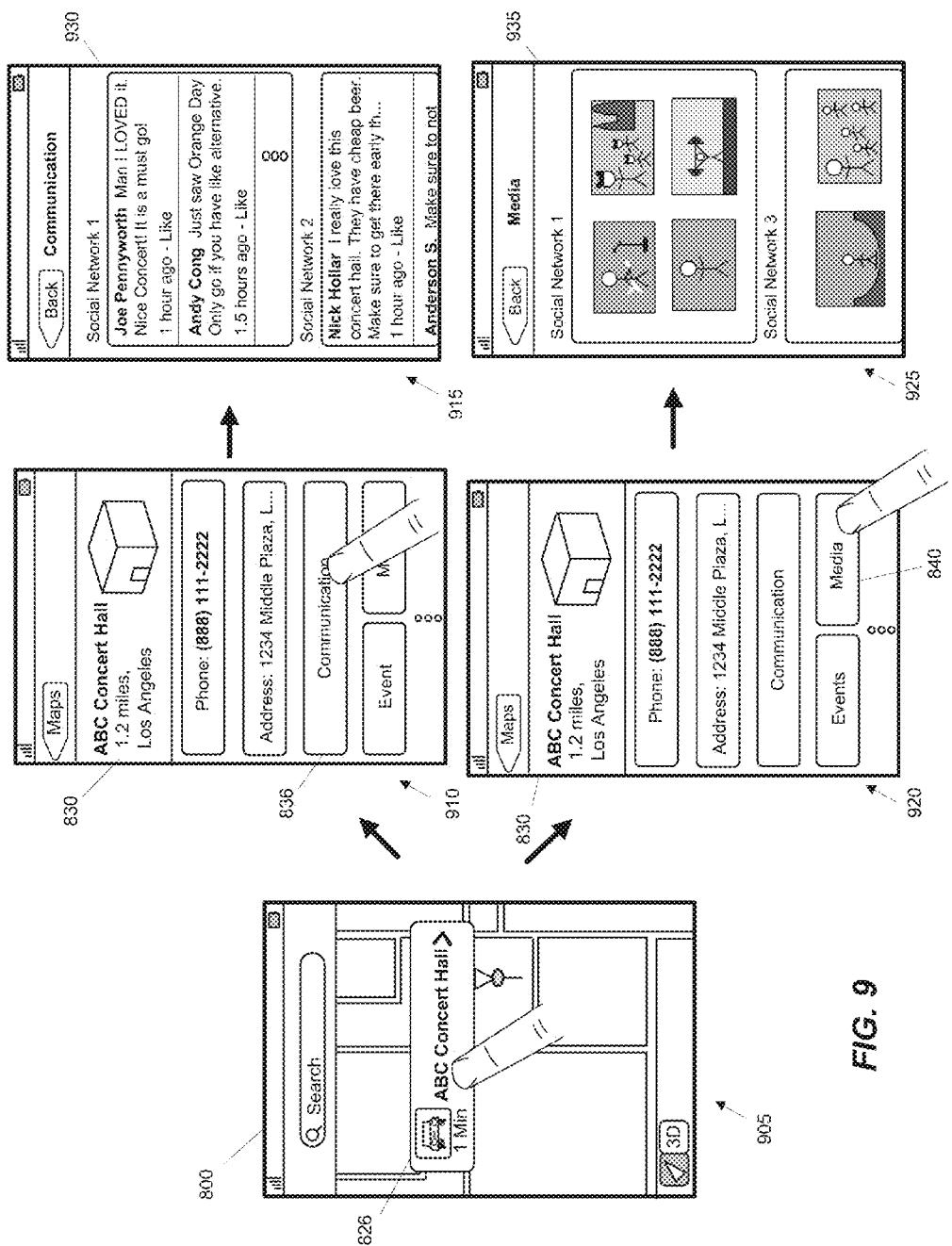
FIG. 9 provides an illustrative example of displaying additional data relating to a location.

FIG. 9 provides an illustrative example of displaying additional data relating to a location. Particularly, this figure illustrates through five operational stages 905-925 how a user can receive additional information about a place that was previously searched in a map application. The first stage 905 is similar to the fifth stage 810 of FIG. 8. The first stage 905 demonstrates the result of a search for "ABC Concert Hall" and display of the location on a map application of the device 800. The user selects the banner 826 in order to receive additional information about the concert hall.

The stages 910 and 920 of this figure are also similar to the sixth stage 812 of FIG. 8. Both stages 910 and 920 show the staging area page 828 that includes different information about the searched place (i.e., ABC Concert Hall) in several different sections. The difference between the two stages is that in each stage the user selects a different tab in order to receive different type of information about the place.

In the second stage 910, the user selects the communication tab 836 in order to see the communications that are related to the place. As shown, the selection of the tab 836 causes the device to display a communication page 930. The communication page 930 lists various communication relating to the location from various different data sources. Specifically, it lists communications from at least two different social network services. The page includes comments that are submitted by different users of a first social network service and comments that are submitted by different users of a second social network service. Each comment is associated with metadata that identify the person that left the comment and time the comment was posted.

In some embodiments, the communications are retrieved from a social network service using a social network account associated with the location (e.g., the business or establishment). Alternatively, or conjunctively, the comments may be retrieved based on tags (e.g., hash tags) associated with different postings. The communication section may include other information, such as reviews of locations, reviews of the goods or services, etc.

The third stage 915 illustrates that the gesture causes the device to display a communication page 930 that includes all the communications related to the location from different data sources. In the fourth stage 920, the user selects the media tab 840 in order to see all the available multimedia related to the location from various data sources. The multimedia in some embodiments can include the pictures and/or video clips that users of social media services have posted to social media sites.

In some other embodiments, any multimedia that has been taken by any individual will be displayed to the user of the application if the name or address of the place is tagged (e.g., hash tagged) in the media and the media is posted with a social network service. In the stage 920, the user directs the map application to display multimedia relating to the location. Specifically, the user taps the user's finger on the touch screen display over the communication tab 840.

The stage 925 illustrates that the gesture causes the device to display a multimedia page 935 that includes all the pictures and media clips related to the place in different social media services. Particularly, this stage shows the pictures and clips that are submitted by different users the first social network service and the pictures and clips that are submitted to the third social network service. The multimedia in this media screen can include any multimedia posted in the location's social network page on the social network website.

II. Example of Other Entities

As mentioned above, in addition to people and locations, the data aggregation framework aggregates communications, location data, and multimedia data relating to entities. In some embodiments, entities represent everything else that does not fall into the people and location categories. An entity in some embodiments can be literally anything that a person or a group of people might be interested in, e.g., an event (e.g., concert, sporting event), food, movie, religion, affiliation, etc.

In some embodiments, the data aggregation framework creates an entity automatically if there is a certain number of people at a particularly event and/or if there is a certain amount of social activities relating to the particular event. For example, in a festival, many people may show up and start using their mobile devices (e.g., smart phones, tablets) to post messages and media. In some embodiments, the data aggregation framework aggregates data relating to the event and automatically creates an entity for that event. An application might receive the aggregated data to present information regarding the event. For example, when a person is within a threshold distance from the event, the application might provide a notification regarding the event entity. The person can then select the notification to display communications, location data, and/or multimedia relating to the event entity.

Figure 10:
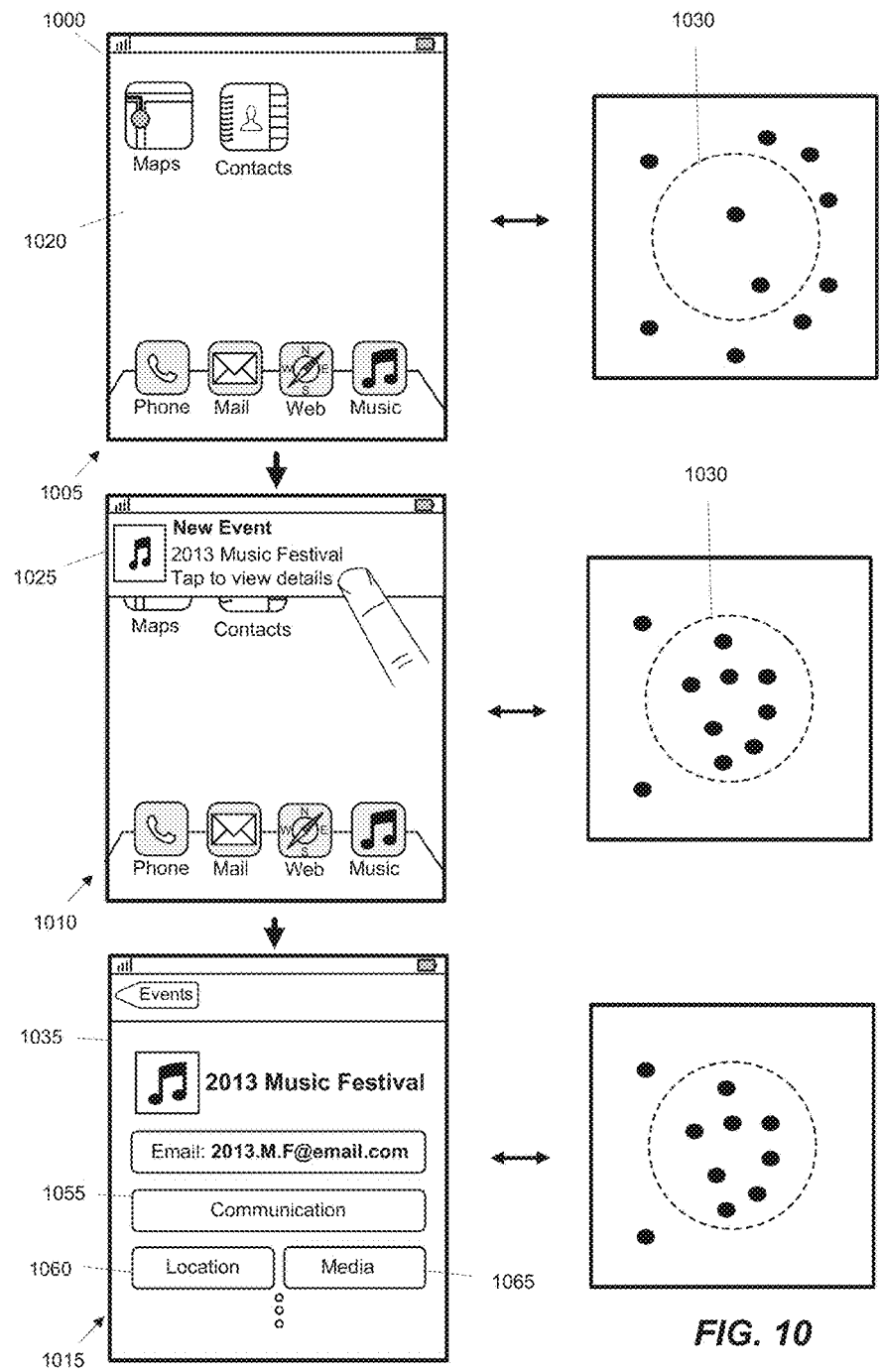
FIG. 10 provides an illustrative example of displaying data relating to an entity.

FIG. 10 provides an illustrative example of automatically creating a new entity and providing a notification regarding that event. Three operational stages 1005-1015 of the device 1000 are shown in the figure. The first stage 1005 illustrates the home page 1020 of the device 1000 displaying two application icons for launching two different applications. The home page 1020 is overlain by a dock that includes four other application icons.

In the example illustrated in FIG. 10, the user of the device 1000 is near the location of a music festival. The circle 1030 in stage 1005 conceptually represents the area (or a part of the area) in which the festival is occurring. Each dot in the circle represents a particular person talking about the event (e.g., through social media). The first stage 1005 shows that there are only two people talking about the event.

The second stage 1010 illustrates that the social media interest in the event has grown. This is conceptually shown by the increase in the number of people at the event. The number of people in the dotted circle 1030 has now increased significantly in comparison with the previous stage. This means that many more users of other devices in the audience are now talking about the music festival (e.g., by posting pictures taken from the festival, adding comments about the festival with social network applications, etc.).

As mentioned above, the data aggregation framework creates an entity automatically if there is a certain number of people at a particularly event and/or if there is a certain amount of social activities relating to the particular event. As it is illustrated in the second stage 1010, a new event (i.e., "2013 Music Festival") is created and the home page 1020 is now overlaid by a banner 1025 for the new event. The banner states that there is a new event. The event is identified by the name of the event. The banner also includes a note to select the banner if the user wishes to view additional details. Here, the user taps the user's finger on the touch screen display over the banner 1025.

The third stage 1015 illustrates that the touch input resulted in the device 1000 displaying a page 1035 relating to the event entity. The page is similar to the staging area page described above by reference to FIG. 3. However, this staging area page 1035 includes affordances to display additional data regarding an event entity rather than a person.

The staging area page 1035 includes a communication tab 1055 for opening a list of different types of communications related to the event, a location tab 1060 for displaying all of the data related to the location of the event, and a media tab 1065 for displaying multimedia (e.g., pictures, videos) related to the event. In some embodiments, the staging area of an entity provides other information. In this example of the third stage 1015, the staging area page 1045 also includes the name of festival, a default thumbnail for the festival next to the name, and an email address of the festival. In some embodiments, one or more of these pieces of information can be provided by anyone. For example, for a given event, an event schedule can automatically show up and the management of that schedule could be open source so anyone can manage it.

III. Access to Shared Info

Some embodiments provide tools that allow a person to choose different social network services that the person would like to share. In some embodiments, the access tools can be used to control access at an individual level (e.g., different shared data for different people) and/or at a group level (e.g., different shared data for different groups of people, such as family, friend, acquaintance, etc.). Several examples of such access tools will now be described below by reference to FIGS. 11-18.

Figure 11:
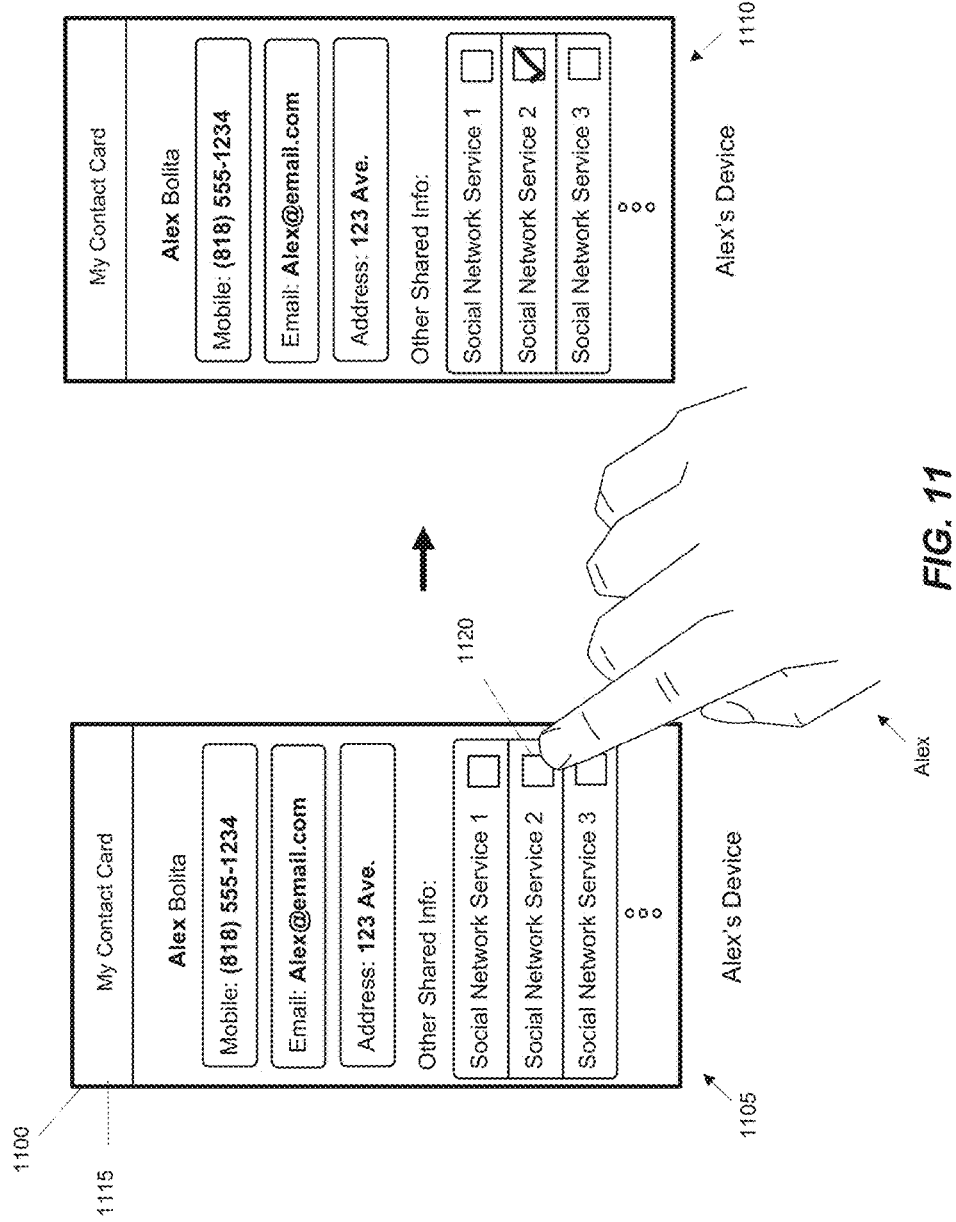
FIG. 11 illustrates an example of person updating the person's contact card with social network information.

In some embodiments, a person's public profile (e.g., a cloud account profile) or public registry is used to define an access control list ("ACL"). The ACL of some embodiments provides a list of social network services that the person would like to share. FIG. 11 illustrates an example of configuring an ACL for sharing data from different applications and/or services. In this example, the ACL is associated with a user's contact card. Two operational stages 1105 and 1110 of the device 1100 are shown in the figure.

In the first stage 1105, the device 1100 is displaying a contact card 1115 on its touch screen display. The user of the device 1100 is Alex Bolita, and the user is editing the user's contact card 1115. The first stage 1105 illustrates the user's contact card 1115 displaying various different information about the user, Alex Bolita. The information includes the phone number, email, and address of the user.

The first stage 1105 also illustrates the user editing the card 1115 to allow access to a social network service. Specially, the card 1115 includes an affordance 1120 to share data relating to the social network service. Here, the user taps the user's finger on the touch screen display over the affordance 1120. In this example, the affordance is a check box; however, it can be any user-interface item to enable or disable sharing of data for the corresponding social network service.

The second stage 1110 shows that the device 1100 after the contact card 1115 has been updated. As shown, the touch input from the first stage 1105 caused the check box for the social network service to appear with a check mark. The check mark provides a visual indication to the user that the user data from the corresponding social network service will be shared with one or more people that have access to this contact card 1115.

Figure 12:
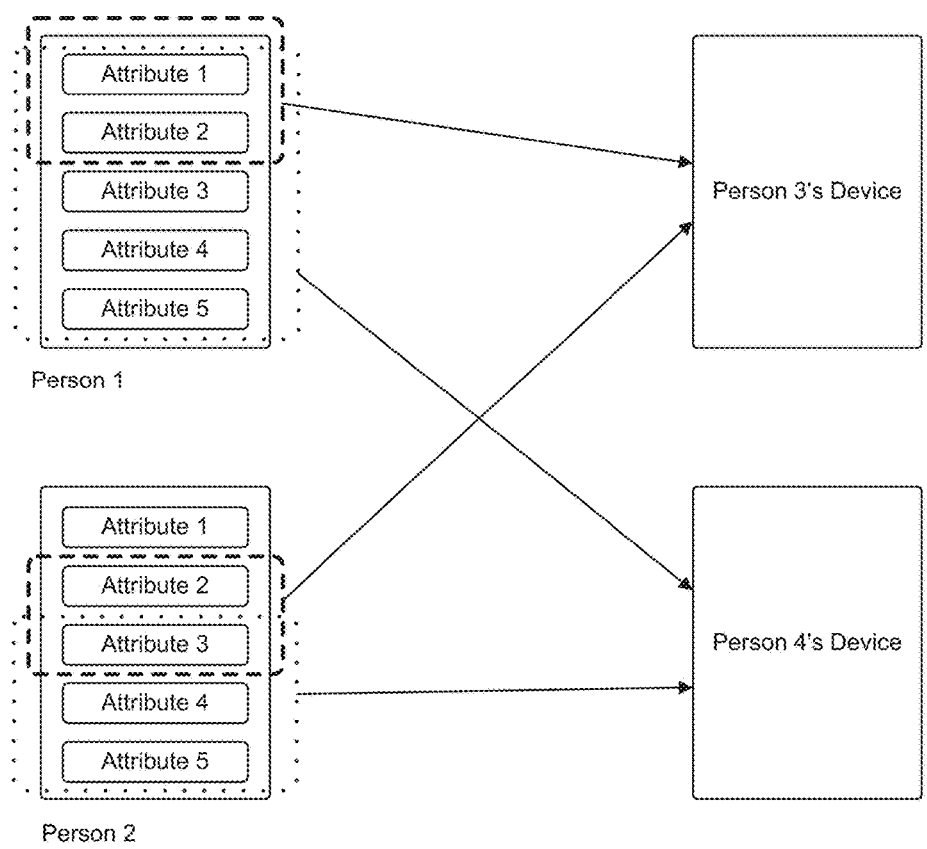
FIG. 12 illustrates specifying different access settings for different individuals.

The access tools of some embodiments allow a user to specify access control at an individual level. That is, the user can granularly specify what user info is available to different individuals. For example, one person can have access to user data from multiple social network services, while another person can have access to user data from only one particular social network service. FIG. 12 illustrates specifying different ACL settings for different people.

FIG. 12 illustrates four people, namely persons 1-4. In this example, person 1 shares one set of user data with person 3 and another set of user data with person 4. Similarly, person 2 shares one set of user data with person 3 and another set of user data with person 4. As illustrated, person 1 currently has five attributes, corresponding to data from different applications and/or services that the person is capable of sharing with other people. Person 1 has permitted person 3 to receive data from only attributes 1 and 2. However, person 1 has permitted person 4 access to data from all attributes 1-5. Thus, person 1 is able to specify, for each different person, what information that particular person is allowed to access from a particular application or service.

Continuing with the illustration, person 2 has permitted person 3 access to data from attribute 2 and attribute 3. Furthermore, person 2 has permitted person 4 access to data from attributes 3-5. Thus, different people can specify different ACLs based on their particular preferences for how their information is to be shared with other people.

The access tools of some embodiments allow a user to specify access control at a group level. That is, the user can specify what user info is available to different groups of people (e.g., acquaintances, friends, family members). For example, a family member can have access to user data from multiple social network services, while an acquaintance can have access to user data from only one particular social network service.

Figure 13:
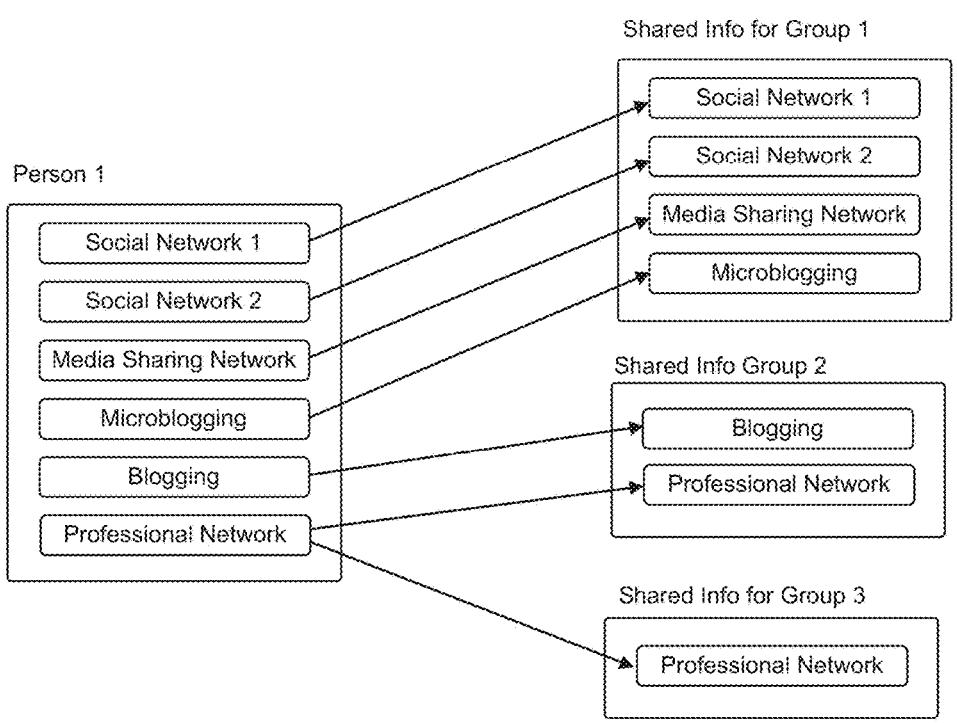
FIG. 13 illustrates specifying different access settings for different groups of people.

FIG. 13 illustrates specifying the ACL such that different groups are provided with different access to information related to the user. Specifically, this figure illustrates a person, "Person 1", that has specified an ACL across various different applications and services, including Social Network 1, Social Network 2, Media Sharing Network, Microblogging Network, Blogging Network, and Professional Network. In some embodiments, a user may specify different ACLs for different groups. In some embodiments, each group may be defined by the user to include a group of persons and/or entities and/or devices. As illustrated, person 1 is sharing different applications/services with different groups. In particular, person 1 is sharing data from Social Network 1, Social Network 2, Media Sharing Network, and Microblogging Network with Group 1. Likewise, person 1 is sharing data from Blogging Network and Professional Network with people and/or devices grouped within Group 2. Lastly, person 1 is also sharing the data from Professional Network with Group 3. The person 1 is able to specify different ACLs for different groups. Accordingly, all of the data related to a particular application will be shared with persons, entities, and devices that have been provided access to the particular data. Likewise, this data will not be accessible by people, entities, or devices that do not have permission to the data. By providing various different mechanisms for specifying ACLs, the user is able to specify exactly where and how their data will be shared across each of the different applications and services.

In some embodiments, the user may specify different access permissions based on an application and/or service type. In particular, a user may specify that a first application is able to share data with all other people or groups while a second application may only share information with people and/or groups that are, for example, designated as "family." Thus, the ACLs may be defined according to application types rather than on an individual person or group basis.

The public profile (e.g., the contact card) can be shared with one person or a group of people. In some embodiments, the public profile is an object that can be sent to one or more individuals (e.g., through email message, through text message). When a public profile is updated on one device, the update may be propagated to each other device that has the same public profile.

Figure 14:
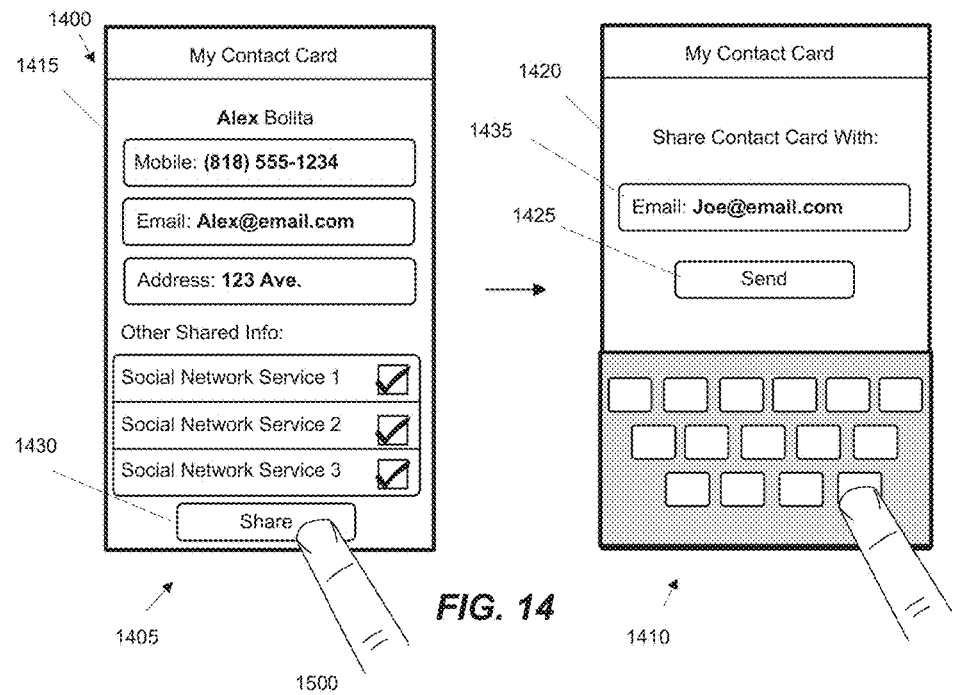
FIG. 14 illustrates an example of a person sharing the person's contact with another person.

FIG. 14 provides an illustrative example of one person sharing his or her contacts card with another person. Two operational stages 1405 and 1410 of the device 1400 are shown in the figure. These stages show the person designating different applications and services to share with another person.

The first stage 1405 illustrates the contact card 1415 of the person, Alex Bolita. As described above, the contact card 1415 includes various information, such as the user's telephone number, e-mail address, and physical address. Furthermore, the contact card allows a user to either select (or de-select) different applications and/or services that the user would like to share. In this example, the user has opted to shared user data from multiple social network services. To share the contact card 1415, the person selects the affordance 1430 (e.g., the share button).

The second stage 1410 illustrates the device after the selection of the affordance 1430. As shown, the device is now displaying a page 1420 to share the contact card. The page includes a label that provides a textual indication to the device's user to input an email address of a person that the user would like to share the contact card with. The page includes a field 1435 to input the email address and a selectable item 1425 to send the contact card via the email address. In the example of the second stage 1410, the user has inputted an e-mail address of a particular person. When the person receives the email, the person can then associate the contact card with the person's device. The person can then use the device to access user data from Social Network Service 1-3 of the user Alex Bolita.

Figure 15:
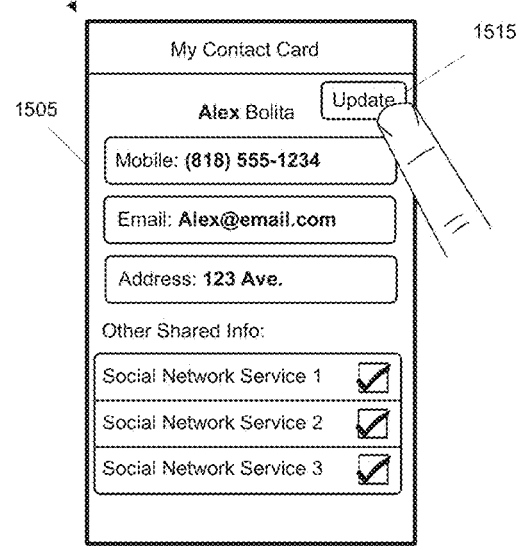
FIG. 15 illustrates an example of synchronizing an update to a contact card across multiple devices.

The previous example illustrated sharing one person sharing a contact card with another person. FIG. 15 illustrates an example of synchronizing an update to a contact card across multiple devices. This figure is similar to the previous figure; however, the device 1500 shows a contact card 1505 with an affordance 1515 to update the card. In this example, the user has updated the contact card. The user then initiates the synchronization by tapping the user's finger on the touch screen display over the affordance 1515 (e.g., the update button).

Figure 16:
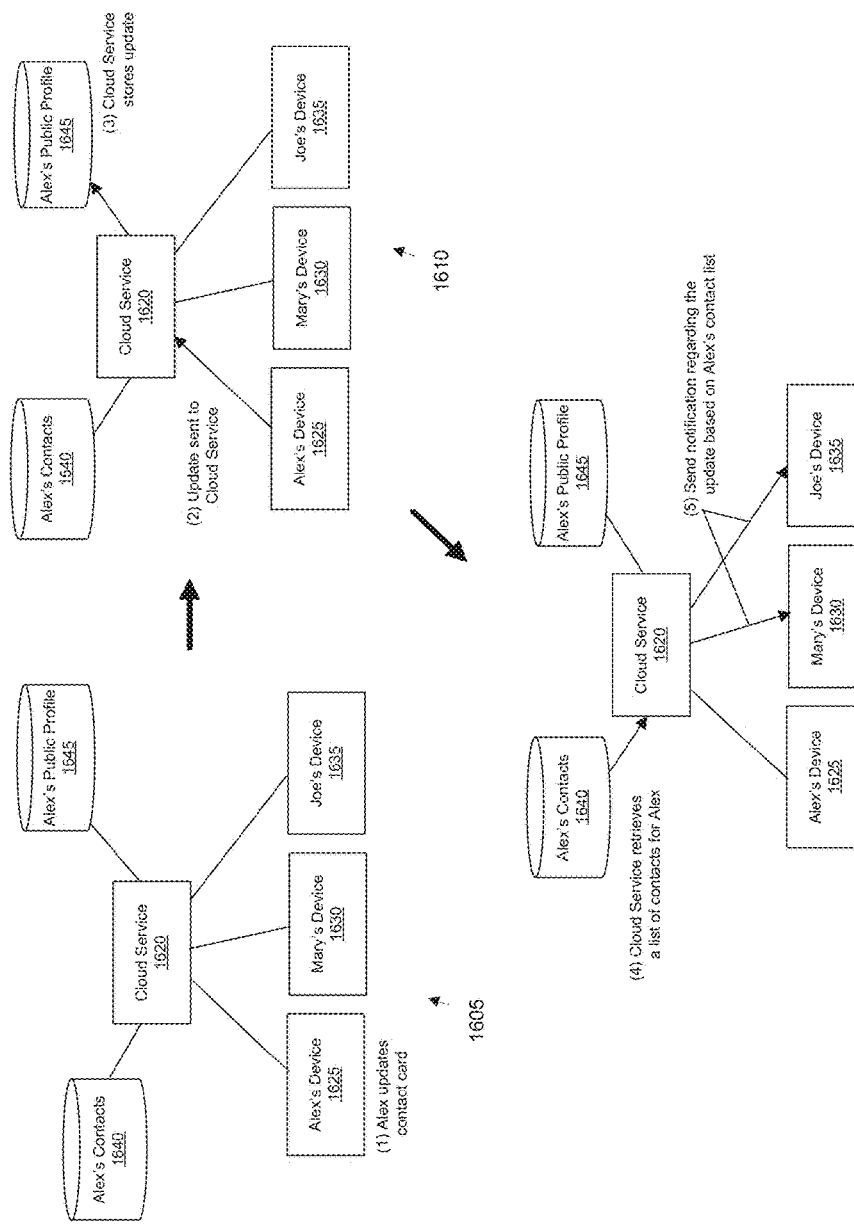
FIG. 16 provides a data flow diagram that illustrates a contact card update that is synchronized across several different devices through a cloud service.

FIG. 16 provides a data flow diagram that illustrates a contact card update that is synchronized across several different devices of different people. Specifically, this figure illustrates, in three data flow stages 1605-1615, a person updating the person's contact card and the updated contact card being synchronized with devices of several other people. This particular example illustrates devices 1625-1635 of three people, Alex, Mary, and Joe communicating with a cloud service 1620. In the first stage 1605, Alex, through Alex's device 1625, has (at 1) updated his contact card.

As illustrated in FIG. 15, Alex may update different information within his contact card including, for example, his telephone number, his email address, or his physical address. Furthermore, Alex may update his ACL to designate different permissions to different applications for sharing data related to Alex. For example, Alex may de-select a social network service from sharing information that has previously been permitted to share information.

In the second stage 1610 of FIG. 16, after Alex updates his contact card, this update is sent (at 2) to the cloud service 1620. After obtaining the information within the updated contact card, the cloud service then uses the contact card to update (at 3) the Alex's public profile 1640. The public profile of some embodiments is used by other devices (e.g., devices 1630 and 1635) to aggregate data regarding the person. As shown in the second stage 1610, the cloud service (at 4) retrieves a list of contacts for Alex. In some embodiments, the cloud service maintains this list for one or more of Alex's device.

In the third stage 1615, based on the retrieved contact list, the cloud service 1620 sends (at 5) a notification regarding the updated contact information to the devices 1630 and 1635. Thus, one or more contacts, including Mary and Joe, receive the updated contact information for Alex. Furthermore, these contacts may now be allowed access various data related to Alex, based on the particular specifications provided within the ACL as specified by Alex. In some embodiments, the cloud service uses a contact's email address to send the update to the other devices (e.g., the devices 1630 and 1635).

In the example described above, an update to a contact card on one device initiates update operations on some other devices that has the same contact card. Instead of the contact card, some embodiments provide tools to update a public profile relating to a person, location, or an entity. For example, the public profile can be a cloud account profile that is associated with the cloud service 1620 or it can be some other public registry that is shared across multiple devices.

In some embodiments, the data aggregation framework provides data from a data source only if the person requesting the data is somehow associated with that data source. As an example, the data aggregation framework aggregates data from a particular social network service and provides that data to an application only if the person initiating the request is singed up, registered with the particular social network service, and/or installed an application from the particular social network service. Several such examples will now be described by reference to FIGS. 17 and 18.

Figure 17:
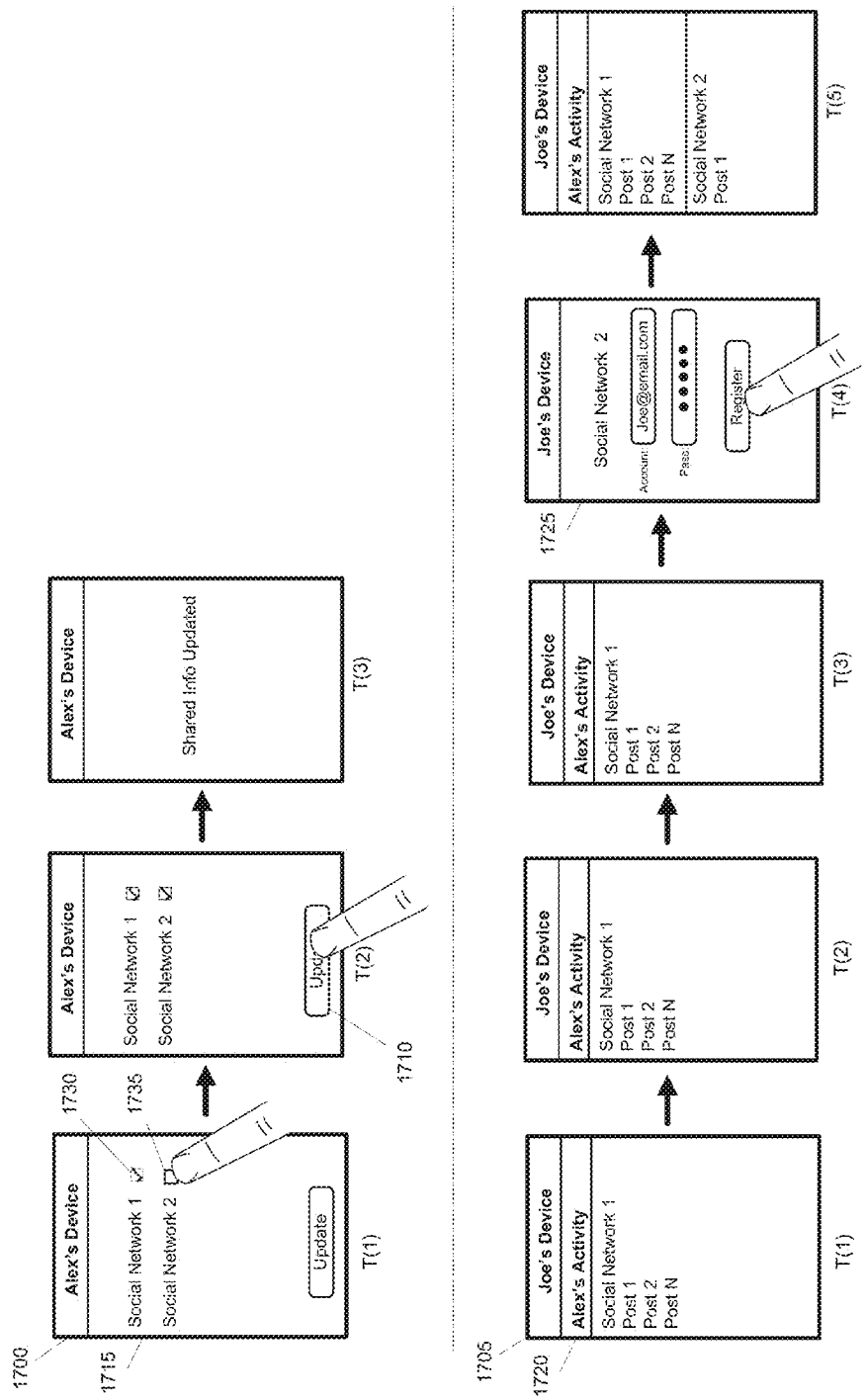
FIG. 17 illustrates an example of a person receiving updates from a social network service after that person signs up with the service.

FIG. 17 illustrates an example of a person receiving updates from a social network service after that person signs up with the service. The figure illustrates two devices 1700 and 1705 at different periods. The device 1700 is Alex's device and is shown at time 1 (T1) through time 3 (T3). The device 1705 is Joe's device and is shown at T1 through T5. This example assumes that Alex is a contact of Joe.

At T1, an update is being made to Alex's contact card 1715. Specially, the device 1700 is displaying the contact card 1715. The selectable item 1730 of the contact card 1715 shows that Alex has previously shared info regarding a first social network. To share info relating to a second social network, Alex taps his finger on the device's touch screen display over the selectable item 1735. After selecting the item 1735, Alex then selects (at T2) the update button 1710. The selection causes the shared contacts info to be updated, as shown by the device 1700 at T3.

At T1 and T2 Joe's device 1705 is displaying data relating to Alex. The device 1705 is displaying an activities page 1720 with Alex's social network posts from the first social network. The page 1720 is not displaying any data relating to the second social network. This is because Alex's contact info has not been updated with the second social network.

At T3, Joe's device 1705 is displaying data relating to Alex. The device 1705 is still displaying the activities page 1720 with Alex's social network posts from the first social network, and is not displaying any posts from the second social network even though Alex's contact info has been updated and the update has been received at the device 1705. This is because the Joe has not installed an application from the second social network service on the device 1705 and/or has not signed-up with the second social network service.

T4 shows Joe registering with the second social network service on a sign-up page 1725. T5 shows the device 1705 after registering with the social network service and reopening the page 1720 with Alex's activities. As shown, the activity list now includes any posts relating to Alex from the second social network service.

Figure 18:
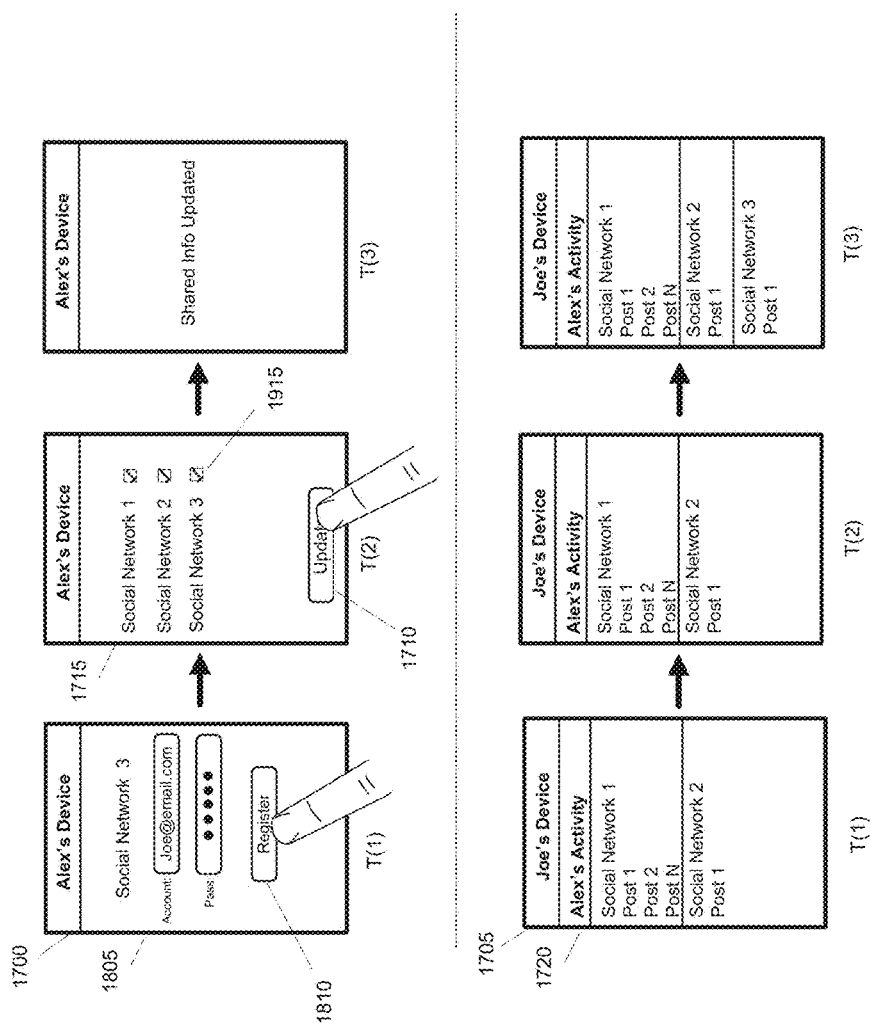
FIG. 18 illustrates another example of the person receiving updates from another social network service.

In the previous example, the Joe's device 1705 receives updates after Joe signs up with a social network service. FIG. 18 illustrates a similar example. However, in this case, the Joe's device 1705 automatically receives updates for a third social network service because Joe has previously signed up for that same service. This figure shows the devices 1700 and 1705 at three different time periods (T1-T3).

At T1, the device 1700 is displaying a sign-up page 1805 for a third social network service. Alex has filled in the necessary information (e.g., account name, password). To register with the service, Alex taps his finger on the touch screen display over the register button 1810.

At T2, an update is being made to Alex's contact card 1715. Specially, the device 1700 is displaying the contact card 1715. Alex has selected the selectable item 1915 for sharing info from the third social network service. Alex then selects (at T2) the update button 1710. The selection of the button causes the shared contacts info to be updated, as shown by the device 1700 at T3.

At T1 and T2, Joe's device 1705 is displaying data relating to Alex. The device 1705 is displaying the activities page 1720 with Alex's social network posts from the first and second social networks. The device 1705 is not displaying any data relating to the third social network. This is because Alex's contact info has not been updated with the third social network, and this update has not been received at Joe's device 1705.

T3 shows Joe's device after it has received a message regarding an update to Alex's contact card. The contact card has been updated with the third social network service. This updates causes the data aggregation framework (not shown) to aggregate data from the third social network service. This is shown at T3 because the activity page 1720 has been updated to include each post relating to Alex from the third social network service.

IV. Software Architecture

Figure 19:
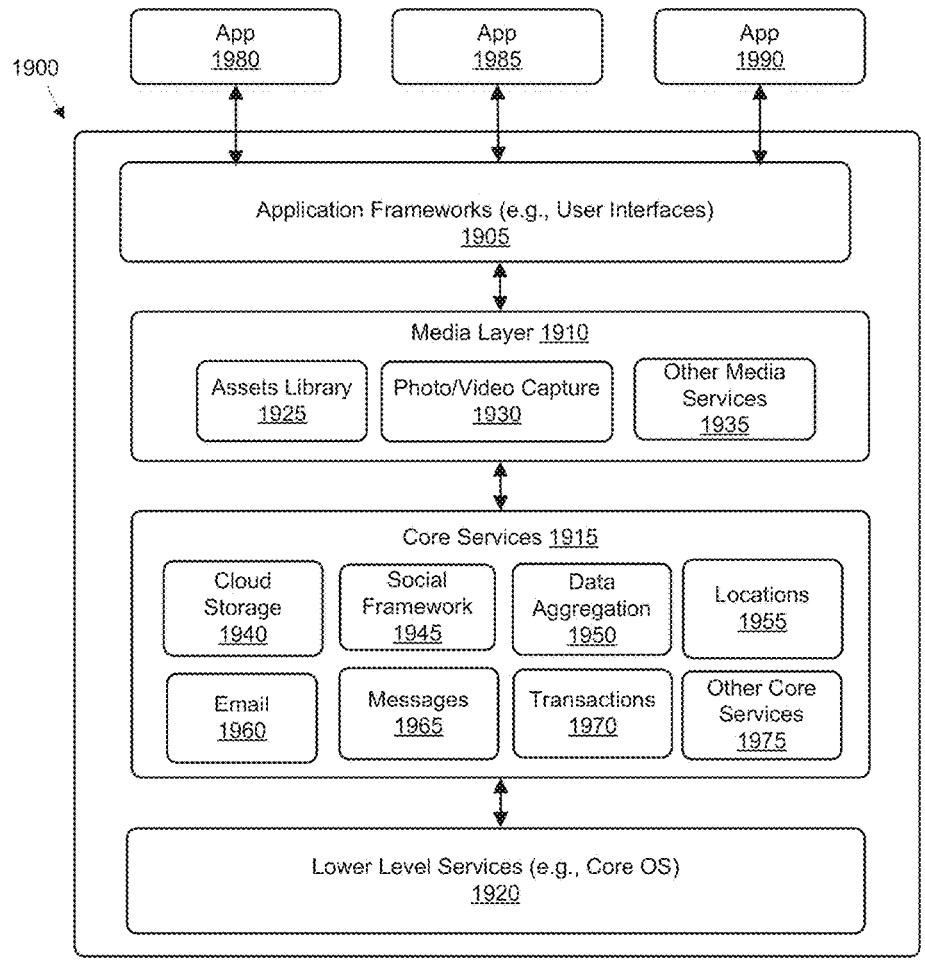
FIG. 19 conceptually illustrates a software architecture of an operating system of some embodiments.

In some embodiments, the data aggregation framework is provided as one of several different services of an operating system (OS). The OS manages the device hardware and provides the services (e.g., frameworks, application-programming interfaces (APIs)) to implement native applications. FIG. 19 conceptually illustrates a software architecture of an OS 1900 of some embodiments. As shown, the figure includes the OS 1900 and several native applications 1980-1990 that runs on the OS. The OS 1900 is defined by several layers 1905-1920. To simplify the discussion, only four layers are shown in the figure, namely an application frameworks layer 1905, a media layer 1910, a core service layer 1915, and a lower level service layer 1920.

The application frameworks layer 1905 includes several key frameworks for building applications. Generally, the frameworks include different components and modules that define the appearance of the application (e.g., the graphical user interface (GUI) of the application). In some embodiments, the frameworks at this layer 1905 also provide the basic application infrastructure and support for several technologies, such as multitasking, touch-based input, push notifications, and other high-level system services.

The media layer 1910 includes the graphics, audio, and video services that can be used to implement multimedia experiences in different applications. This layer 1910 is mostly concerned with presentation of images, video, and audio. Here, the layer includes an asset library framework 1925, a photo/video capture framework 1930, and other media services 1935.

The assets library framework 1925 allows an application to access photos, videos, and other media. The application (1980, 1985, or 1990) can use the asset library framework 1925 to integrate media content. For example, an application might use this framework 1925 in conjunction with the data aggregation framework 1950 to gather multimedia relating to a person, location, or an entity. In some embodiments, the asset library framework 1925 can also be used to organize content. For example, the framework provides tools to tag content (e.g., with the name of a person, location, or entity) and/or create different collections (e.g., albums). In some embodiments, the data aggregation framework uses the tag and/or album name to aggregate multimedia regarding a person, location, or entity.

As shown in FIG. 19, the media layer 1910 includes the photo/video capture framework 1930. In some embodiments, the photo/video capture framework 1930 provides tools to choose media files and capturing new content (e.g., photos, audio clips, video clips). In some embodiments, the media layer 1910 includes other services 1935 to draw graphics, provide animation, perform rendering, perform multimedia playback, integrate streaming media (e.g., AirPlay), etc.

The core services layer 1915 includes many different key services that can be used to build applications. In the example of FIG. 19, these service frameworks include (1) a cloud storage framework 1940, (2) a social network framework 1945, (3) a data aggregation framework 1950, (4) a locations framework 1955, (5) an email framework 1960, (6) a messages framework 1965, (7) a transactions framework 1940, and (8) other core services 1975.

The cloud storage framework 1940 allows application to write to cloud storage. In some embodiments, one or more public profiles of a person are saved to the cloud using this cloud storage framework 1940. An example of updating such a public profile is described above by reference to FIG. 16. In that example, a control server (e.g., a ubiquity cloud server) is used to store a person's public profile in a cloud storage (e.g., a storage server). The public profile includes, in some embodiment, the person's contact info (e.g., name, email address, mailing address, telephone number) as well as other supplemental information, such as account information (e.g., account name, account handle) for different social network sites. When the public profile is updated, the control server of some embodiments notifies other people (e.g., the devices of other people with the public profile) to update the public profile.

The social network framework 1945 provides tools to access social media accounts. An example of such a social network framework is described above by reference to FIG. 2. The social network framework 1945 allows programmers to integrate applications with supported social networking services. In some embodiments, this framework 1945 provides a template for creating data requests (HTTP requests). The framework of some embodiments provides various modules to create a network session, get the activity feed for different users, make a new post, set properties on a post, add attachments (e.g., images, videos), publish a post to an activity feed, etc. In some embodiments, the social network framework 1945 is used to retrieve the activity feed from one or more different social network services. Once retrieved, the data aggregation framework 1950 of some embodiments aggregates the activity feed and provides the activity feed to a requesting application (e.g., the application 1980, 1985, or 1990).

In some embodiments, the transactions framework 1970 is used to track activities relating to a person, location, or entity. This framework 1970 provides the tools to interface with other social network applications and/or services that are not supported by the transactions framework 1970. The main reason for having the transactions framework 1970 is that overtime there will be other social networks. These other social network can integrate their service by calling or registering with the framework's APis. For example, the transactions framework 1970 may support several of the more popular social network services (e.g., using the APis of the social network services). On the other hand, the transactions framework 1970 provides the tools to integrate other social network services. Similar to the social network framework 1945, the transactions framework 1970 provides various modules to create a network session, get the activity feed for different users, make a new post, set properties on a post, add attachments (e.g., images, videos), publish a post to an activity feed, etc.

In some embodiments, the email framework 1960 allows different applications to send and receive emails. The messages framework 1965 allows different applications to send and receive text messages. The data aggregation framework 1950 of some embodiments operates in conjunction with one or more of these messaging frameworks 1960 and 1965 to aggregate data (e.g., emails, text messages, attachments, etc.).

The locations framework 1955 provides location and heading information to applications. For location information, the framework 1955 of some embodiments uses a device's GPS, cell, or Wi-Fi radios to find the device's current longitude and latitude. This framework 1955 can be used to provide position-based information to the user. One example usage of the location information is described above by reference to FIG. 4. In that example, the locations framework 1955, which operates on a first device, provides location data to a second device. The data aggregation framework, which operates on the second device, aggregates the location data for an application. The application then uses the location data to render a map of the current location of the user of the first device.

In some embodiments, the locations framework 1955 is used to track the current location of a person and provide a notification based the current location. For example, the application might use the locations framework 1955 to notify a person when there is a new entity (e.g., a new event) that is nearby. An example of such notification is described above by reference to FIG. 10. In some embodiments, the locations framework 1955 can also be used to search for nearby locations (e.g., restaurants, shops, facilities)

As shown in FIG. 19, the core services layer 1915 includes other core services 1975. In some embodiments, these other core services include an address book framework for accessing to a user's contacts database. In some embodiments, the contacts database can a person's contact info (e.g., name, email address, mailing address, telephone number) as well as other supplemental information, such as account information (e.g., account name, account handle) for different social network sites. In addition to the address book framework, the core service layer includes other services, including peer-to-peer framework for peer-to-peer connectivity over a network (e.g., Bluetooth), data protection framework for encrypting data, file sharing support framework to share files, etc.

The lower level services 1920 provide many low-level features that are used by services at the higher layers. In some embodiments, the lower level services 1920 encompass kernel environment, drivers, and low-level interfaces of the OS 1900. The lower level services 1920 may also include a security framework to control security, a radio communication framework to communicate through radio, etc.

One of ordinary skill in the art would understand that the software architecture described above is one example architecture and can be modified in a number of different ways. For example, the OS 1900 may include additional or fewer layers. The different frameworks and APIs can be provided at different layers. For example, the email or messages framework may be at a higher layer (e.g., the media layer 1910) or a lower layer (e.g., the lower level services layer 1920).

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
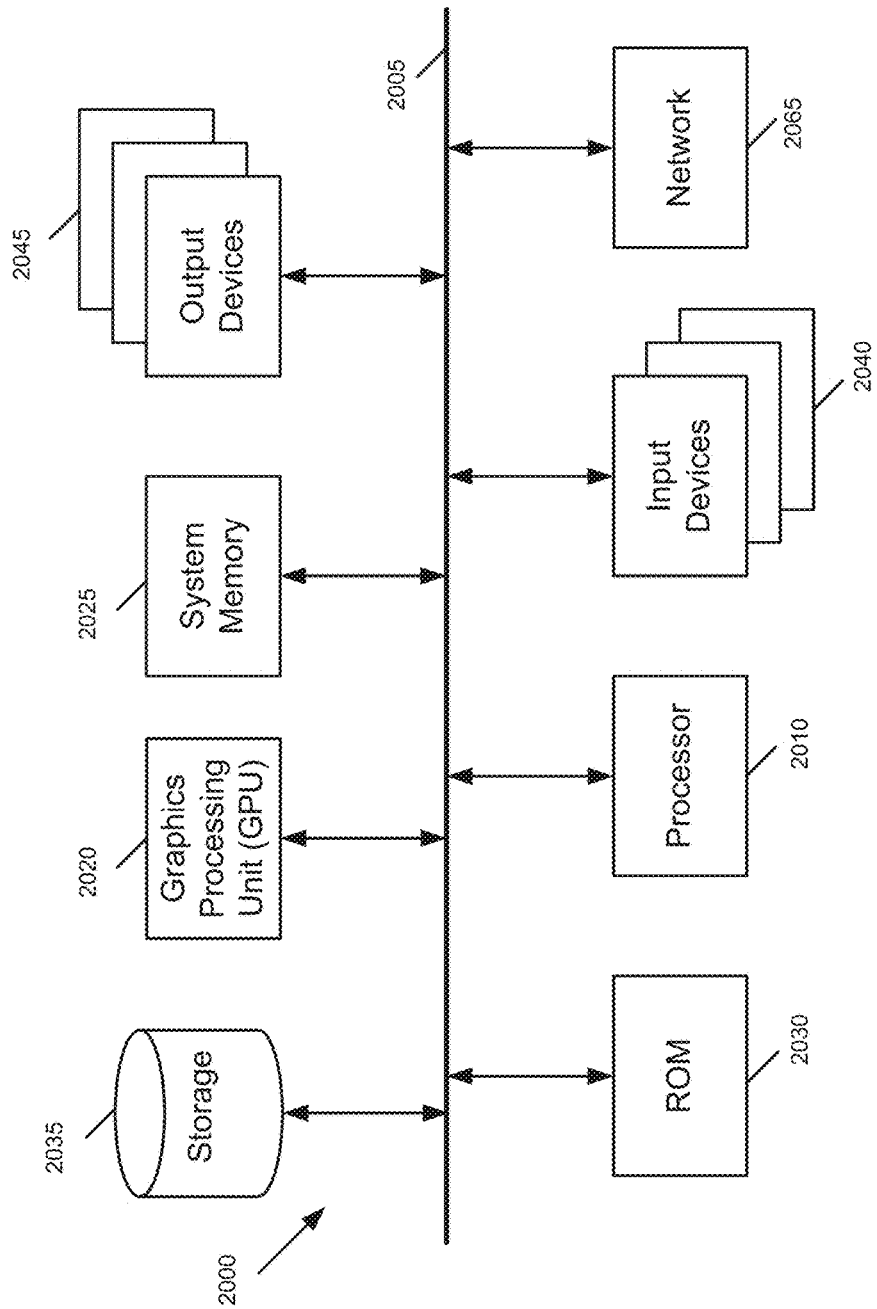
FIG. 20 conceptually illustrates an electronic system with which some embodiments of the invention are implemented.

FIG. 20 conceptually illustrates an electronic system 2000 with which some embodiments of the invention is implemented. The electronic system 2000 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 2000 includes a bus 2005, processing unit(s) 2010, a system memory 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the system memory 2025, and the permanent storage device 2035.

From these various memory units, the processing unit(s) 2010 retrieves instructions to execute and data to process in order to execute the processes of the invention. The processing unit(s) may be a single processor or a multi-core processor in different embodiments.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash memory device, etc., and its corresponding drive) as the permanent storage device. Like the permanent storage device 2035, the system memory 2025 is a read-and-write memory device. However, unlike storage device 2035, the system memory 2025 is a volatile read-and-write memory, such a random access memory. The system memory 2025 stores some of the instructions and data that the processor needs at runtime. In some embodiments, the invention's processes are stored in the system memory 2025, the permanent storage device 2035, and/or the read-only memory 2030. From these various memory units, the processing unit(s) 2010 retrieves instructions to execute and data to process in order to execute the processes of some embodiments.

The bus 2005 also connects to the input and output devices 2040 and 2045. The input devices 2040 enable the user to communicate information and select commands to the electronic system. The input devices 2040 include alphanumeric keyboards and pointing devices (also called "cursor control devices"), cameras (e.g., webcams), microphones or similar devices for receiving voice commands, etc. The output devices 2045 display images generated by the electronic system or otherwise output data. The output devices 2045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 20, bus 2005 also couples electronic system 2000 to a network 2065 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention.

What is claimed is:

1. A method, comprising:
at an electronic device with a display:
displaying a list of contacts of a user in a contact application;
while displaying the list of contacts, detecting selection of a first contact in the list of contacts;
in response to detecting selection of the first contact, displaying a first page for the first contact that includes a plurality of different affordances for initiating communications from the electronic device to the first contact;
retrieving content from a first content source that contains current information from the first content source that is specific to the first contact, wherein the first content source is a map application;
retrieving content from a second content source, different from the first content source, that contains current information from the second content source that is specific to the first contact, wherein the second content source is a social networking application that is distinct from the map application;
while displaying the first page for the first contact, detecting a touch input on the first page for the first contact; and,
in response to detecting the touch input on the first page for the first contact, replacing display of the first page for the first contact with display of a second page for the first contact that concurrently displays:
a first graphical representation of the retrieved content from the first content source that contains current information from the first content source that is specific to the first contact, wherein the first graphical representation is a map that displays a current location of the first contact as determined by the map application; and
a second graphical representation of the retrieved content from the second content source that contains current information from the second content source that is specific to the first contact, wherein the second graphical representation is a map that displays a current location of the first contact as determined by the social networking application.

2. The method of claim 1, wherein the second page is displayed in the contact application.

3. The method of claim 1, including:
while displaying the second page for the first contact, detecting a touch input on the second page for the first contact; and,
in response to detecting the touch input on the second page for the first contact, scrolling the second page for the first contact to display information from a third content source that contains current information from the third content source that is specific to the first contact.

4. The method of claim 1, including:
while displaying the second page for the first contact, detecting a touch input on the second page for the first contact; and,
in response to detecting the touch input on the second page for the first contact, replacing display of the second page with the first page for the first contact that includes the plurality of different affordances for initiating communications from the electronic device to the first contact.

5. The method of claim 1, wherein the first content source is a first application, and the method includes:
while displaying the second page for the first contact, detecting a touch input on the first graphical representation of the retrieved content from the first content source; and,
in response to detecting the touch input on the first graphical representation of the retrieved content from the first content source, displaying the first application on the electronic device.

6. The method of claim 1, wherein the second page for the first contact concurrently displays an item that, when selected, initiates a process for providing directions from a current location of the electronic device to a current location of the first contact.

7. The method of claim 1, wherein the current location of the first contact as determined by the social networking application is a location that the first contact checked into with a social networking service.

8. An electronic device, comprising:
a display;
one or more processors;
memory; and
one or more programs, wherein the one or more programs are stored in the memory and configured to be executed by the one or more processors, the one or more programs including instructions for:
displaying a list of contacts of a user in a contact application;
while displaying the list of contacts, detecting selection of a first contact in the list of contacts;
in response to detecting selection of the first contact, displaying a first page for the first contact that includes a plurality of different affordances for initiating communications from the electronic device to the first contact;
retrieving content from a first content source that contains current information from the first content source that is specific to the first contact, wherein the first content source is a map application;
retrieving content from a second content source, different from the first content source, that contains current information from the second content source that is specific to the first contact, wherein the second content source is a social networking application that is distinct from the map application;
while displaying the first page for the first contact, detecting a touch input on the first page for the first contact; and,
in response to detecting the touch input on the first page for the first contact, replacing display of the first page for the first contact with display of a second page for the first contact that concurrently displays:
a first graphical representation of the retrieved content from the first content source that contains current information from the first content source that is specific to the first contact, wherein the first graphical representation is a map that displays a current location of the first contact as determined by the map application; and
a second graphical representation of the retrieved content from the second content source that contains current information from the second content source that is specific to the first contact, wherein the second graphical representation is a map that displays a current location of the first contact as determined by the social networking application.

9. The electronic device of claim 8, wherein the second page is displayed in the contact application.

10. The electronic device of claim 8, wherein the one or more programs include instructions for:
while displaying the second page for the first contact, detecting a touch input on the second page for the first contact; and,
in response to detecting the touch input on the second page for the first contact, scrolling the second page for the first contact to display information from a third content source that contains current information from the third content source that is specific to the first contact.

11. The electronic device of claim 8, wherein the one or more programs include instructions for:
while displaying the second page for the first contact, detecting a touch input on the second page for the first contact; and,
in response to detecting the touch input on the second page for the first contact, replacing display of the second page with the first page for the first contact that includes the plurality of different affordances for initiating communications from the electronic device to the first contact.

12. The electronic device of claim 8, wherein the first content source is a first application, and wherein the one or more programs include instructions for:
while displaying the second page for the first contact, detecting a touch input on the first graphical representation of the retrieved content from the first content source; and,
in response to detecting the touch input on the first graphical representation of the retrieved content from the first content source, displaying the first application on the electronic device.

13. The electronic device of claim 8, wherein the second page for the first contact concurrently displays an item that, when selected, initiates a process for providing directions from a current location of the electronic device to a current location of the first contact.

14. The electronic device of claim 8, wherein the current location of the first contact as determined by the social networking application is a location that the first contact checked into with a social networking service.

15. A non-transitory computer readable storage medium storing one or more programs, the one or more programs comprising instructions, which when executed by an electronic device with a display, cause the electronic device to:
display a list of contacts of a user in a contact application;
while displaying the list of contacts, detect selection of a first contact in the list of contacts;
in response to detecting selection of the first contact, display a first page for the first contact that includes a plurality of different affordances for initiating communications from the electronic device to the first contact;
retrieve content from a first content source that contains current information from the first content source that is specific to the first contact, wherein the first content source is a map application;
retrieve content from a second content source, different from the first content source, that contains current information from the second content source that is specific to the first contact, wherein the second content source is a social networking application that is distinct from the map application;
while displaying the first page for the first contact, detect a touch input on the first page for the first contact; and,
in response to detecting the touch input on the first page for the first contact, replace display of the first page for the first contact with display of a second page for the first contact that concurrently displays:
a first graphical representation of the retrieved content from the first content source that contains current information from the first content source that is specific to the first contact, wherein the first graphical representation is a map that displays a current location of the first contact as determined by the map application; and a second graphical representation of the retrieved content from the second content source that contains current information from the second content source that is specific to the first contact, wherein the second graphical representation is a map that displays a current location of the first contact as determined by the social networking application.

16. The computer readable storage medium of claim 15, wherein the second page is displayed in the contact application.

17. The computer readable storage medium of claim 15, including instructions, which when executed by the electronic device with the display, cause the electronic device to:

while displaying the second page for the first contact, detect a touch input on the second page for the first contact; and, in response to detecting the touch input on the second page for the first contact, scroll the second page for the first contact to display information from a third content source that contains current information from the third content source that is specific to the first contact.

18. The computer readable storage medium of claim 15, including instructions, which when executed by the electronic device with the display, cause the electronic device to:

while displaying the second page for the first contact, detect a touch input on the second page for the first contact; and, in response to detecting the touch input on the second page for the first contact, replace display of the second page with the first page for the first contact that includes the plurality of different affordances for initiating communications from the electronic device to the first contact.

19. The computer readable storage medium of claim 15, wherein the first content source is a first application, and wherein computer readable storage medium includes instructions, which when executed by the electronic device with the display, cause the electronic device to:

while displaying the second page for the first contact, detect a touch input on the first graphical representation of the retrieved content from the first content source; and, in response to detecting the touch input on the first graphical representation of the retrieved content from the first content source, display the first application on the electronic device.

20. The computer readable storage medium of claim 15, wherein the second page for the first contact concurrently displays an item that, when selected, initiates a process for providing directions from a current location of the electronic device to a current location of the first contact.

21. The computer readable storage medium of claim 15, wherein the current location of the first contact as determined by the social networking application is a location that the first contact checked into with a social networking service.

* * * * *